US006638466B1

(12) United States Patent
Abbott

(10) Patent No.: US 6,638,466 B1
(45) Date of Patent: Oct. 28, 2003

(54) METHODS OF MANUFACTURING SEPARABLE STRUCTURES

(75) Inventor: Ric Abbott, Andover, KS (US)

(73) Assignee: Raytheon Aircraft Company, Wichita, KS (US)

(*) Notice: Subject to any disclaimer, the term of this patent is extended or adjusted under 35 U.S.C. 154(b) by 47 days.

(21) Appl. No.: 09/750,202

(22) Filed: Dec. 28, 2000

(51) Int. Cl.[7] .................. B29C 65/00; B29C 70/32
(52) U.S. Cl. .............. 264/238; 264/241; 264/255; 264/257; 264/258; 264/264
(58) Field of Search ................. 264/238, 264, 264/257, 258, 241, 255

(56) References Cited

U.S. PATENT DOCUMENTS

| | | | |
|---|---|---|---|
| 5,332,178 A | * 7/1994 | Williams | 244/123 |
| 5,641,525 A | 6/1997 | Yakel | 425/390 |
| 5,718,864 A | 2/1998 | Bailey | 264/328.4 |
| 5,851,336 A | 12/1998 | Cundiff et al. | 156/272.2 |
| 6,143,215 A | * 11/2000 | McCollum et al. | 264/40.1 |
| 6,261,499 B1 | * 7/2001 | Okeke et al. | 264/242 |

FOREIGN PATENT DOCUMENTS

| | | | |
|---|---|---|---|
| EP | 0 697 945 B1 | * | 9/1997 |
| JP | 58208029 A | | 12/1983 |
| JP | 58-208029 | * | 12/1993 |
| WO | WO 98/32589 A1 | | 7/1998 |

OTHER PUBLICATIONS

Abbott, "Damage Tolerance Evaluation of Composite Honeycomb Structures," Raytheon Aircraft Company (May 1998).

Swain, et al., "Advanced Manufacturing Techniques Utilizing Carbon Fiber Braid and RTM," Raytheon Aircraft Company (May 2000).

Tomblin, et al., "Material Qualification Methodology for 2x2 Biaxially Braided RTM Composite Material Systems," (Oct. 1999).

Tomblin, et al., "Material Qualification Methodology for Epoxy–Based Prepreg Composite Material Systems," (Dec. 1997).

* cited by examiner

Primary Examiner—Stefan Staicovici
(74) Attorney, Agent, or Firm—O'Keefe, Egan & Peterman, LLC

(57) ABSTRACT

Methods for manufacturing composite material structures having one or more separable or replaceable skin portions. In one embodiment, the methods may include positioning first and second material pieces adjacent each other within a mold cavity and with a separating film disposed therebetween, introducing a first resin into the mold cavity to contact and substantially impregnate the first material piece with the first resin, and allowing the first resin to cure within the mold cavity to form a first part of the composite structure; and in which the separating film is substantially impermeable to the first resin.

26 Claims, 9 Drawing Sheets

METHODS OF MANUFACTURING SEPARABLE STRUCTURES

BACKGROUND OF THE INVENTION

1. Field of the Invention

This invention relates generally to composite material structures and, more specifically, to methods for manufacturing composite material structures. In one particular embodiment, this invention relates to single cure composite material structures formed with one or more separable and replaceable portions using resin transfer molding methods.

2. Background

Composite materials, such as carbon fiber present in an organic matrix, have been used to produce corrosion resistant and light weight structures. These structures typically weigh about 25% less than structures made of lightweight metals, such as aluminum, while at the same time offering similar strength to these metals. Composite structures have offered performance improvements in terms of lower weight, increased stiffness, and long fatigue life, and have been used to fabricate a wide variety of structures including, for example, aircraft structures (such as fuselage shell components, wing sections, tail sections, etc.). These composite structures have typically been manufactured by time consuming methods, such as hand placement and autoclave cure. For example, in one process for manufacturing hollow landing gear doors, resin impregnated prepreg materials have been hand laid-up on mandrels with a non-stick dividing material placed between sections of the prepreg material so as to isolate one wall of the landing gear door structure from the remaining walls of the structure during lay-up and cure, thus forming a removable wall section through which the mandrels could be later removed, and then the wall section replaced to form the finished door. However, traditional hand lay-up autoclave composite construction is labor intensive, uses high cost resin-impregnated raw materials that require special storage, and therefore often results in costly finished structures.

Many composite structures, such as aircraft wings and tails, are manufactured in multiple and separate parts so as to provide needed access to the interior of the structure for insertion of parts prior to final assembly. For example, traditional composite structure methods of producing a complex aircraft part such as a wing typically involve separate fabrication and curing of skeleton and skin components, and involve assembly after all internal parts are installed. Not only is this traditional method labor intensive, but the skins typically do not exactly match the skeleton, and customizing measures are usually needed during assembly to correct the gaps or interferences between the skins and the skeleton, requiring a substantial amount of time to achieve a uniform and consistent fit.

Single cure closed tool Resin Transfer Molding ("RTM") is a method of forming composite structures in which one piece composite parts are cured under high temperature and high pressure in a closed tool using a single cure cycle. In a conventional RTM procedure, dry carbon fiber fabrics are applied to a mandrel, loaded into a tool, then injected with resin and cured to form a completed structure, thus eliminating the need for assembly of the traditional individually fabricated parts such spars and skins. For example, using one single cure RTM method in the manufacture of wing flaps, dry carbon fiber braided material is fitted over or wrapped around inner mandrels and placed inside a mold. The mold is closed around the mandrels and placed in a heated press. A vacuum is then drawn on the interior of the mold and a predetermined volume of heated resin injected into the mold to saturate the dry braided material. A relatively high pressure is applied to the resin, and the tool is heated to cure temperature. After the cure cycle is complete, the mold is removed from the press, and the mandrels and composite part are removed from the mold to cool, prior to removal of the mandrel from one of the open ends of the composite part.

Single cure closed tool RTM methods produce structures which have a relatively low labor content, and because dry fiber material is used no special storage of resin impregnated fiber material prepreg is required. Because a one piece composite structure is produced in a single step, considerable labor cost is saved by eliminating assembly steps. This is in part because of the ability to mold completed assemblies and also because parts may be cured in the molding tool, instead of requiring that the parts in the molding tool be move to an autoclave for curing. Use of a closed tool RTM method enables a closed structural section (e.g., box-like structures) to be fabricated in one piece, eliminating the assembly steps necessary when the spars and skins are fabricated separately. The tools for RTM curing typically allow for the tool itself to be heated and allow for pressure to be applied hydraulically to the resin whereas traditional methods of composite fabrication rely on the autoclave to apply heat and pressure.

Single cure closed tool RTM processes have been used to produce simple aircraft composite structures (e.g., wing flaps, drain mast) more quickly and efficiently than other methods. RTM processes have been tried using combinations of liquid injected resin and prepreg materials, and a combination of injected liquid resin and prepreg materials has been employed to produce a landing gear door. However, one factor that has hampered the use of closed tool RTM processes to produce larger and more complex hollow aircraft structures (e.g., wings and tails) is lack of access to the inside of the-completed composite structure. As previously described, access is typically required for such structures in order to install supporting structures such as ribs, and equipment such as fuel pumps and gages. For example, ribs may be desirable in an aircraft wing fuel tank to prevent the fuel from "sloshing" out towards the wing tip when the airplane rolls into a one wing down attitude. However, the current technology single cure cycle RTM part has no accessibility except from each end.

SUMMARY OF THE INVENTION

Disclosed herein are single cure RTM processes that may be employed to produce high quality composite structures having relatively lightweight and relatively low fabrication costs, and which offer the advantages of a single in-tool cure cycle while at the same time allowing internal equipment and/or internal structure to be added to a post cure structure. In one embodiment are methods that advantageously allow the use of single cure closed tool RTM process to fabricate relatively large and complex closed section structures such as an aircraft wing or tail fin (e.g., box like structures with a front spar, a rear spar, and with top and bottom skins) in one piece, while permitting full access to virtually any pre-determined part of the internal structure, thus eliminating extra assembly steps necessary when the spars and skins for such components are fabricated separately.

Advantageously, using the disclosed RTM process a relatively low cost one piece structure (e.g., wing or tail fin section) may be fabricated in a single cure cycle, but in a manner that allows access to the inside of the structure after cure (e.g., to add internal ribs to control fuel slosh/pressure and to add equipment such as fuel pumps and gauges). Surprisingly, the disclosed RTM process may be used to produce a composite structure having a separable part (e.g., separable top skin, separable bottom skin, or any other portion of the structure thereof) that is substantially separable from the rest of the structure (e.g., the skeleton) after cure. In one embodiment, the separable part (or any portion thereof) may be easily reconnected to the structure by virtue of the fact that it is molded as a matching part of the structure during the cure cycle.

When the disclosed single cure RTM processes are used to manufacture an aircraft wing or tail structure having a separable skin portion, the separable skin and the skeleton are cured in the same tool and with the same cure cycle. Therefore, the disclosed processes offer a major benefit over traditional processes that rely on fabrication of individually fabricated skins and associated skeleton of an aircraft wing or tail because a separable skin and the adjacent skeleton substructure share a substantially perfectly matching surface due to the fact that they are cured together. These parts are therefore substantially perfectly matched at their common surfaces even after separation of the skin portion from the skeleton substructure, virtually eliminating the issues and problems associated with fitting together and reconnecting the separated skin to a skeleton substructure.

Advantageously, the separable skin portion (e.g., of an aircraft wing or tail) may be separated after cure and removal of the entire structure from the molding tool and may remain separated from the remainder of the structure until all installations, sealing and inspections have been completed. Further advantageously, final assembly of the structure typically does not require elaborate tooling to hold and align the separable skin with the skeleton substructure, as the separable skin portion may only be oriented in one way relative to the skeleton so as to achieve a substantially perfectly matching fit with the skeleton. Thus, in one embodiment, wings for fighters, trainers, or business jets, as well as tails for larger airliners may be cured in a single cure cycle in a mold and still allow access to the internal structure due to the provision for separation of the top or bottom skin of such parts from the substructure and easy reinstallation of same to the substructure.

Further advantageously, the disclosed single cure RTM processes may be employed to fabricate structures having sandwich cored skins, such as a honeycomb core surrounded by layers of carbon fiber. Composite skins formed in this manner offer lightweight strength and resistance to buckling due to presence of, for example, a honeycomb core, but at the same time may be advantageously fabricated using an efficient and relatively low cost RTM process that allows fabrication of such a skin without resin-saturation of the honeycomb core, as would occur with conventional RTM processes. In this regard, the honeycomb core may be surrounded by prepreg fiber material that prevents contact of the honeycomb core with the injected resin, and which includes resin advantageously selected to have the same curing characteristics as the RTM resin, thus allowing the entire structure to cure during the same RTM curing cycle.

Thus in one respect disclosed herein is a composite structure, and a method of forming the same which includes: positioning first and second material pieces adjacent each other within a mold cavity and with a separating film disposed between the first and second material pieces, the first material piece including an impregnable fiber material piece; introducing a first resin into the mold cavity to contact and substantially impregnate the first material piece with the first resin; allowing the first resin that substantially impregnates the first material piece to cure within the mold cavity to form a first part of the composite structure; and in which the separating film is substantially impermeable to the first resin. The separating film may be selected to substantially prevent the first resin from contacting the second material piece and so that the first resin substantially does not adhere to the separating film during the curing of the first resin so that the separating film may be substantially separable from each of the composite structure first part and the second material pieces after the first resin is cured.

The separating film may have opposing first and second surfaces; and the method may include positioning at least one surface of the first material piece in contact with the first surface of the separating film and positioning at least one surface of the second material piece in contact with the second surface of the separating film; so that the separating film substantially prevents the first resin from contacting the at least one surface of the second material piece and so that the composite structure first part and the second material pieces are substantially separable from each other after the first resin is cured.

In one embodiment, a first material piece may include one or more material pieces with at least one surface of the first material piece having an open area defined therein between a first area of the first material piece and a second area of the first material piece; and wherein the positioning includes positioning the at least one surface of the first material piece adjacent a first surface of the separating film with a resin transport film disposed therebetween so that the resin transport film may be in a position effective to transport the introduced resin from the first area of the first material piece across the open area to the second area of the first material piece. In another embodiment, the method may further including forming an open area within a surface of the composite structure first part after separating the first and second composite structure parts; wherein the open area may be formed so as to be covered by the second composite structure part when the first and second composite structure parts are refitted together.

In another respect, disclosed herein is a cured composite structure, and a method of forming the same which includes: positioning a first material piece at least partially around an outer surface of at least one mandrel, the first material piece including a dry fiber material piece; positioning a second material piece adjacent the first material piece with a separating film disposed therebetween to form an uncured composite structure; positioning the uncured composite structure and the mandrel within a closed mold cavity; introducing a first resin into the closed mold cavity to contact and at least partially impregnate the first material piece with the first resin; allowing the first resin that at least partially impregnates the first material piece to cure within the mold cavity to form at least a portion of a cured composite substructure, the cured composite substructure and the second material piece together forming the cured composite structure; removing the cured composite structure from the closed mold cavity; and removing the mandrel from the cured composite substructure to form a hollow cured composite structure. In this method, the separating film may be selected to be substantially impermeable to the first resin, and the cured composite substructure may be substantially separable from the second material piece after removal from the closed mold cavity.

In another respect, disclosed herein is a hollow cured composite aircraft structure, and a method of forming the same using a single cure RTM process which includes: positioning a first fiber material piece at least partially around an outer surface of at least one mandrel, the first material piece including a dry fiber material piece; positioning a second fiber material piece adjacent the first fiber material piece with a separating film disposed therebetween to form an uncured composite aircraft structure, wherein the separating film may have opposing first and second surfaces, and wherein at least one surface of the first material piece may be positioned in contact with the first surface of the separating film and at least one surface of the second material piece may be positioned in contact with the second surface of the separating film; positioning the uncured composite aircraft structure and the mandrel within a closed mold cavity; introducing a first resin into the closed mold cavity to contact and at least partially impregnate the first fiber material piece with the first resin; allowing the first resin that at least partially impregnates the first fiber material piece to cure within the mold cavity during a single cure cycle to form at least a portion of a cured composite aircraft substructure; allowing a second resin that at least partially impregnates the second fiber material piece to cure within the mold cavity during the single cure cycle to form at least a portion of a cured composite aircraft structure skin, the cured composite aircraft substructure and the cured composite aircraft structure skin together forming a cured composite aircraft structure; removing the cured composite aircraft structure from the closed mold cavity; and removing the mandrel from the cured composite substructure to form the hollow cured composite aircraft structure.

In this method, the separating film may be selected to be substantially impermeable to the first and second resins so that the separating film substantially prevents the first resin from contacting the at least one surface of the second fiber material piece that may be in contact with the second surface of the separating film, and so that the separating film substantially prevents the second resin from contacting the at least one surface of the first fiber material piece that may be in contact with the first surface of the separating film. In the practice of method, the materials may be selected so that the first resin substantially does not adhere to the separating film during the curing of the first resin and the second resin substantially does not adhere to the separating film during the curing of the second resin so that the cured composite aircraft substructure is substantially separable from the cured composite structure skin and so that the separating film is substantially separable from each of the cured composite aircraft substructure and the cured composite aircraft structure skin after the first and second resins are cured and after removal of the cured composite aircraft structure from the closed mold cavity. The method may further include separating the separating film from the cured composite aircraft substructure and the cured composite aircraft structure skin after removal of the composite aircraft structure from the mold cavity, and then refitting together the hollow cured composite aircraft substructure and the cured composite aircraft structure skin.

DESCRIPTION OF ILLUSTRATIVE EMBODIMENTS

Described herein are illustrative embodiments of the disclosed single cure RTM process as used to fabricate aircraft structures having one or more separable skin portions such as wing sections, tail sections, etc. However, it will be understood with benefit of this disclosure that the disclosed process may be advantageously practiced to fabricate any type of closed or partially closed composite structure having one or more separable skin portions, and may be especially beneficial in the fabrication of those structures where access to the interior of the structure is important or desirable. Examples of other types of composite structures that may be so fabricated include, but are not limited to, aircraft components other than wings or tail sections, components of non-aircraft vehicles (e.g., boats, cars, trucks, buses, trains, helicopters, space vehicles, etc.), as well as stationary structures such as wind turbine blades and antenna structures. It will also be understood that a separable skin section/s may be permanently attached to a substructure of a composite part to form a permanently closed finished structure, or may be removably attached to a substructure so as to form a finished structure with one or more removable skin sections (e.g., using hinges, removable fasteners such as screws, etc.).

Figure 1:
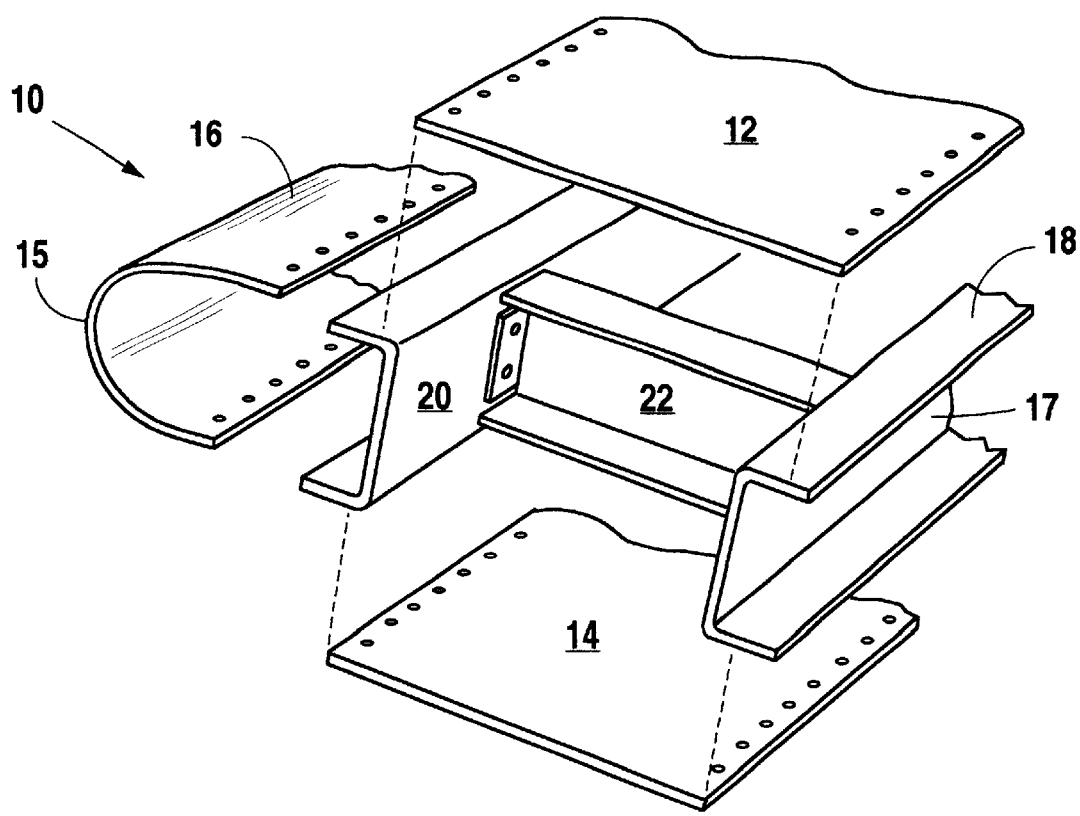
FIG. 1 is a simplified and expanded partial sectional perspective view of a composite aircraft structure assembled in a conventional manner from separately fabricated components.

FIG. 1 shows individual components of an aircraft structure that have been individually fabricated for assembly together into a completed structure using conventional methods. Individual components of aircraft structure 10 include skin sections 12, 14, and 16 that are fabricated for attachment to longitudinal spar sections 18 and 20 using fasteners such as rivets or adhesives. Spar section 20 is shown as a C-section with an open side facing leading edge 15 of the structure, and spar section 18 is shown as a C-section with an open side facing trailing edge 17 of the structure, for example, to provide an attachment point for control surfaces, etc. Transverse rib sections 22 are shown attached between spar sections 20 and 18, for example, using fasteners or adhesive. In such a conventional fabrication method for manufacture of aircraft structures (e.g., wings or tail fin sections), care must be taken in the fabrication of each individual component so that it mates with adjoining components with an adequate degree of precision. It may be appreciated that the individual manufacture and assembly of multiple components into a single structure is both time consuming and costly.

Figure 2:
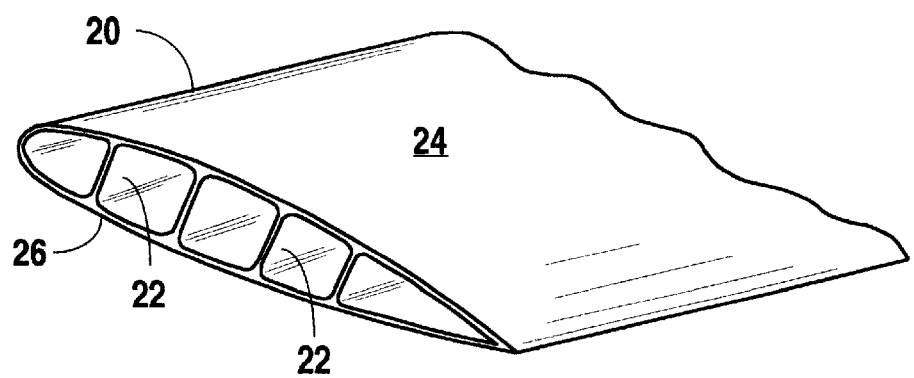
FIG. 2 is a simplified and partial sectional perspective view of a composite aircraft structure fabricated as a single piece using a conventional RTM process.

FIG. 2 illustrates a one-piece closed composite aircraft structure, such as wing flap section, manufactured using a conventional single-cure RTM process. As shown in FIG. 2, longitudinal spars are formed from webs 22 in one piece along with outer skins 24 and 26 during the conventional RTM process. Because composite structure 20 is a closed structure, it is not possible to gain access to the interior of structure 20 to install components such as structural ribs, electronic or mechanical equipment, etc. Additional information on conventional single cure RTM processes may be found, for example, in U.S. Pat. Nos. 5,641,525; 5,718,864 and 5,851,336; D. Swain and R. Abbott, "Advanced Manufacturing Techniques Utilizing Carbon Fiber Braid and RTM," 45$^{th}$ International SAMPE Symposium, May, 2000; and in J. Tomblin, Y. Ng, K. Bowman, and E. Hooper, "Material Qualification Methodology for Epoxy-Based Prepreg Composite Material Systems," Wichita State University (Advanced General Aviation Transports Experiments-AGATE) February 1999; each of which is incorporated herein by reference.

Figure 3:
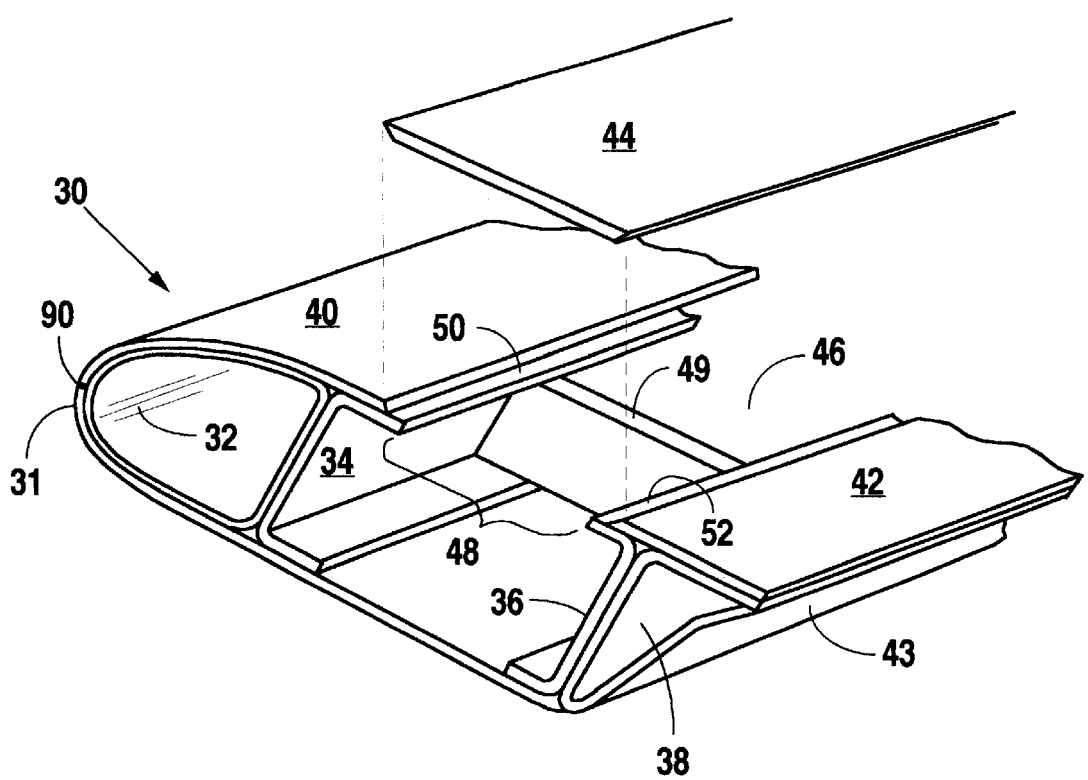
FIG. 3 is a simplified and expanded partial sectional perspective view of a composite aircraft structure fabricated with a separable skin using a RTM process according to one embodiment of the disclosed method.
Figure 4:
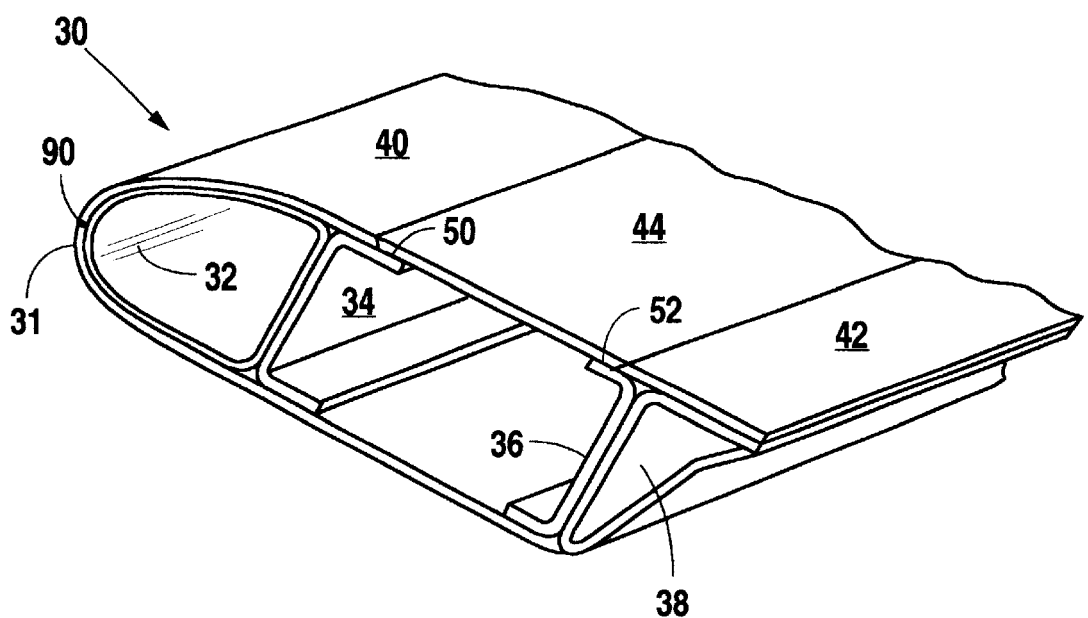
FIG. 4 is a simplified and partial sectional perspective view of a composite aircraft structure fabricated with a separable skin using a RTM process according to one embodiment of the disclosed method.

FIGS. 3–5 illustrate one embodiment of the disclosed single cure RTM process employed to manufacture an aircraft composite wing structure having a separable skin section that includes a portion of the upper skin of the wing structure that is separable from the remainder of the upper skin. FIG. 3 shows a single cure RTM composite aircraft wing structure 30 having a skeleton or composite substructure 31 that includes webs 32, 34, 36, and 38 to which fixed outer skin sections 40 and 42 are attached. In this regard, web sections 32, 34, 36, and 38 and fixed outer skin sections 40 and 42 are formed from respective dry fiber materials that are impregnated with resin and cured together during the RTM curing process so as to form a single piece composite part. As shown in FIG. 3, separable skin section 44 is removable from the skeleton substructure to allow access to interior space 46 of composite part 30. Such a separable skin section may be described as a portion of the outside layer of a single cure RTM composite structure that has been fabricated and cured simultaneously with other portions of the composite structure, but which is substantially separable therefrom by virtue of the use of a separating film or other separating material employed during a RTM curing process in a manner described elsewhere herein.

RTM components (e.g., simultaneously cured RTM composite parts and/or associated separating/resin transport films employed in the formation of same) that may be considered to be substantially separable from each other include those that are freely separable when cured (e.g., with little or no resin connection or adhesion between the components when removed from the mold). However, cured RTM components may also be considered substantially separable from each other when they may be separated substantially without structural damage to the individual RTM composite structure parts or without substantial damage to the fit therebetween, even when a minor amount of tooling (e.g., cutting) or physical manipulation (e.g., breaking away) is required to separate and/or surface dress the components after curing. Examples of such components include simultaneously cured composite structure parts connected by non-fiber containing junctions of resin "flash" or bridges of resin between the components. As described elsewhere herein with regard to resin flash, the surface of a composite structure may be dressed by grinding or other suitable tooling method to eliminate any roughness or other surface anomaly that may result from removal of resin flash and/or separation of composite structure parts from each other.

Still referring to FIG. 3, separable skin 44 is so dimensioned to form a tight and substantially sealing fit in open area 48 which exists between fixed skin sections 40 and 42. Thus, when separable skin 44 is removed from substructure 31, access is provided to interior space 46, for example, to allow insertion of transverse rib sections 49 (e.g., metal or carbon fiber ribs that are attached with adhesive or fasteners) between the spars formed from longitudinal webs 34 and 38, to allow insertion of electrical or mechanical parts (not shown), etc. In the illustrated embodiment, trailing edge surface 43 is shown having an open configuration for mating with a separate control surface structure, such as a separate flap or aileron structure, to form a complete aerodynamic structure. However, it will be understood that a trailing edge of a single RTM substructure may be alternatively configured to have a close shape to form a complete aerodynamic structure without the need for mating with other structures.

FIG. 4 shows the composite aircraft structure 30 of FIG. 3 with separable skin 44 disposed in sealing relationship between fixed skin sections 40 and 42. In the embodiment shown, separable skin section 44 is supported by lip sections 50 and 52 which are formed from portions of web sections 34 and 36 which extend into open area 48 as shown in FIG. 3. In this regard, it will be understood with benefit of this disclosure that separable skin 44 may be permanently affixed to the skeleton substructure 31 (e.g., using adhesives or permanent fasteners), or may be removably attached to the skeleton substructure (e.g., using removable fasteners). For example, when separable skin section 44 is employed to allow access for installation of permanent equipment during assembly of the structure, it may be desirable to permanently affix separable skin section 44 following assembly. On the other hand, it may be desirable to removably attach separable skin section 44 so as to allow future access to interior space 46, for example, for inspection or repair purposes.

Although FIGS. 3 and 4 illustrate a composite aircraft wing structure having a single separable skin section, it will be understood with the benefit of this disclosure that a wide variety of aircraft and non-aircraft structures of various sizes and shapes may be fabricated using the disclosed single-cure RTM process. Furthermore, it will be understood that aircraft composite structures such as those illustrated in FIGS. 3 and 4, or any other type of aircraft or non-aircraft structure fabricated using the disclosed RTM process may have more than one separable skin sections as so desired, for example to provide access to various portions of a single composite structure interior space and/or to multiple composite structure interior spaces. In this regard, it will be understood that a separable skin section 44 such as shown in FIGS. 3 and 4 may be provided as multiple sections (e.g., such as inspection plates) rather than a single longitudinal piece as illustrated.

Figure 5A:
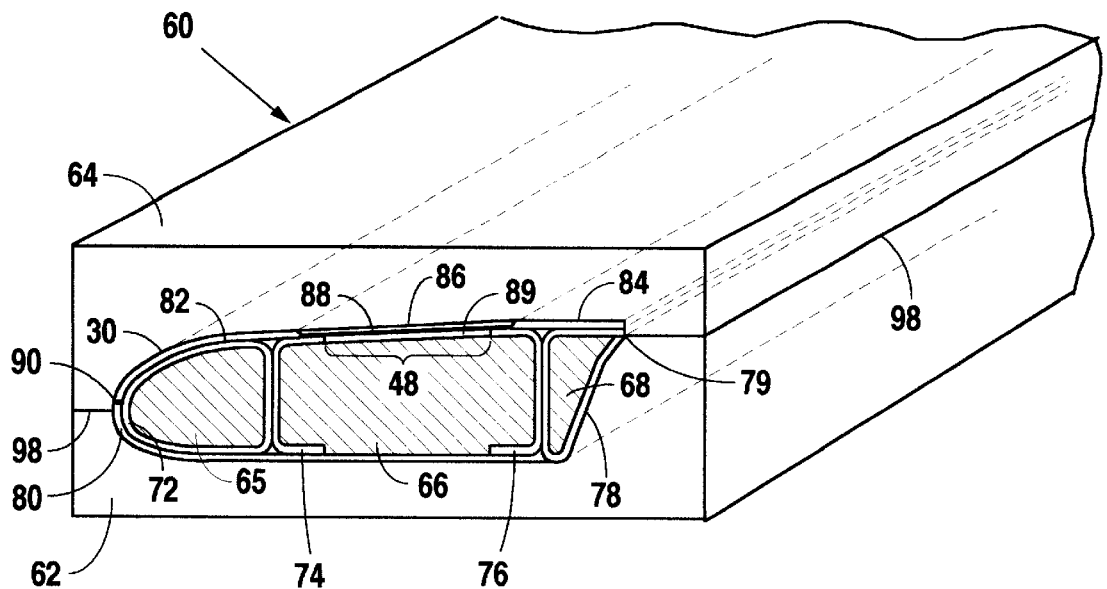
FIG. 5A is a simplified and partial sectional perspective view of a composite aircraft structure including separable skin shown in place within an RTM mold according to one embodiment of the disclosed method.

FIG. 5A shows the composite aircraft structure 30 of FIGS. 3 and 4 in place within resin transfer mold apparatus 60 that includes a first mold half 62 and a second mold half 64. Not shown are resin/pressure inlets provided in mold 60 for supplying pressure and heated resin to the interior cavity of mold 60 formed between mold halves 62 and 64. In this regard, RTM mold equipment (e.g., molds, presses, resin pumps, etc.) are known in the art and available from companies such as RADIUS ENGINEERING of Salt Lake City, Utah. Such mold assemblies are typically heated and configured to be pressure sealable when separate mold halves are sealably joined together around composite materials as shown in FIG. 5A to form a cured composite structure part. Such RTM mold assemblies are typically configured to be placeable within a press suitable for holding the mold halves together around the composite materials placed inside under a predetermined amount of internal pressure to be applied to the part during resin injection and curing.

In FIG. 5A, composite structure materials are shown placed within the closed mold cavity formed between sealed mold halves 62 and 64. As used herein, "closed mold cavity" includes any cavity suitable for RTM molding of composite structures that is formed by one or more mold sub-pieces (such as two separate mold halves), and into which resin may be injected and cured as part of an RTM molding process. The composite materials shown in FIG. 5A include dry fiber material placed to partially or completely surround longitudinal mandrels 65, 66, and 68. As used herein "fiber material" includes any fiber-containing, fiber-based, or fiber-like material suitable for use in composite structure manufacture including, but not limited to, fabrics manufactured from fibers or fibrous material. Examples include, but not limited to, carbon fiber, fiberglass, or aramid fiber materials available from, for example, commercial sources such as Dupont, Cytec/Fiberite, A & P Technology, Hercules, Toray Company, etc. The term "dry fiber" includes any fiber material suitable for use in an RTM process through which injected resin may move or otherwise be displaced during an RTM process, such as fiber materials that are substantially void of resin content. Dry fiber materials may have any suitable format including, but not limited to, formats such as woven (e.g., plain weave, twill weave, flexible harness-weave: 5 harness, 8 harness, etc.), stitched composite stack materials, knitted, braided (2 axis, 3 axis, etc.), unidirectional fibered (e.g., tape), multi-directional fibered, etc. These types of material are available from, for example, commercial sources such as Cytec/Fiberite, A & P Technology, Hercules, Toray Company, etc.

Mandrels 65, 66, and 68 may be of any material suitable for providing a surface against which fiber material may be placed, and which when in place within mold 60 forms a gap with the interior surfaces of mold 60 such that desired fiber volume and resin content may be achieved within the gap. In one embodiment, mandrels may be aluminum. As shown in FIG. 5A longitudinal mandrels 65, 66, and 68 extend longitudinally through the cavity formed between mold halves 62 and 64. The ends of mold 60 are sealed and supported during the RTM process, for example, using mold end caps (not shown) that are described in further detail with respect to FIGS. 9–11. Although mold and a mandrel assemblies suitable for forming one particular aircraft wing composite structure are illustrated in FIG. 5A, it will be understood with the benefit of this disclosure that various combinations of mandrel sizes, shapes, and number, as well as mold cavity shapes and sizes may be employed by those of skill in the art to achieve desired composite structure shape and form, for example, using materials and methods known for use in conventional RTM processes for forming single piece composite structures.

As shown in FIG. 5A, each of mandrels 65, 66, and 68 are wrapped or covered with respective dry fiber material pieces 72, 74, 76 and 78 prior to placement within mold 60. In this regard, all mandrel, spacer and mold interior parts may be wiped or coated with a layer of non-stick material (e.g., TEFLON™, TEDLAR™) to discourage or substantially prevent sticking of resin to the RTM process tools. Any dry fiber material suitable for placement partially or completely around mandrels 65, 66 and 68, and for forming composite structures using RTM processing may be employed. Specific examples of suitable materials include, but are not limited to, dry fiber materials described elsewhere herein having formats such as woven, stitched, knitted, braided, unidirectional fibered, multi-directional fibered, etc. Such materials may be carbon fiber-based or alternatively may be fiberglass or KEVLAR™ from Dupont. Specific examples of suitable dry fiber materials include, but are not limited to, plain weave, twill, or harness woven fabrics, braided sleeves and stitched crossplied unidirectional materials. Mixtures of such materials are also possible, such as a lay up of unidirectional tape and fabric to meet strength requirements, such as longitudinal wing direction.

In the illustrated embodiment of FIG. 5A, dry fiber material 72 may be an expandable braided fiber material sleeve (such as two or three axis braided fabric sleeves available from A & P Technology) that is suitably dimensioned so as to be snugly placed around mandrel 65 by slipping the fiber material over the end of the mandrel like a sock. When such an expandable braided fiber material sleeve is employed, a relatively tight fit around a mandrel may be achieved, despite any taper in the mandrel shape and size. To achieve this property, such braided fiber material sleeves are typically elastically expandable so as to allow the sleeve to slip over the mandrel but yet retain a firm fit around the exterior of the mandrel body. Dry fiber materials 74 and 76 are shown placed only around opposing ends of mandrel 66, such as by hand lay up and temporary attachment using, for example, curable adhesive tape and/or sprayed on adhesive.

Any suitable dry fiber material described elsewhere herein may be employed for dry fiber materials 74 and 76. Examples include single layer pieces of fiber material, or pieces of two-axis braided fiber sleeve (e.g., same as dry fiber material 72) that is collapsed to form two layers or cut in half to form one layer. Dry fiber material 78 is shown placed completely around mandrel 68 but with a joint 79 formed at the trailing edge. This jointed construction may be employed where one or more surfaces of a mandrel have a concave shape (such as mandrel 68), or other shape that is not well suited for snug covering with a braided fiber material sleeve. Fiber material 78 may be selected from the same types of materials as described for fiber materials 74 and 76, and may also be applied, for example, with hand lay up and temporarily attached with suitable tape or adhesive.

Prior to placement of dry fiber material covered mandrels 65, 66, and 68 into first mold half 62, a first outer dry fiber material layer 80 is placed into the cavity of first mold half 62 as shown. Next, dry fiber material covered mandrels 65, 66, and 68 are placed on top of the first dry outer fiber material layer within first mold half 62 as illustrated. Next, second dry fiber material layers 82 and 84 are placed over dry fiber material covered mandrel sections 65, 66, and 68 as shown. Any suitable dry fiber material as described elsewhere herein (including dry plain weave fabric) may be employed for use as dry fiber material layers 80, 82, and/or 84, and in one embodiment such material may be multiple plies of carbon fiber, glass fiber or KEVLAR ™ fibers. After RTM processing and curing, fiber material portions 72, 74, 76 and 78 form internal fiber material structure or webs 32, 34, 36 and 38, that are surrounded by skins 40 and 42 formed from dry fiber material layers 80, 82, and 84.

Figure 5B:
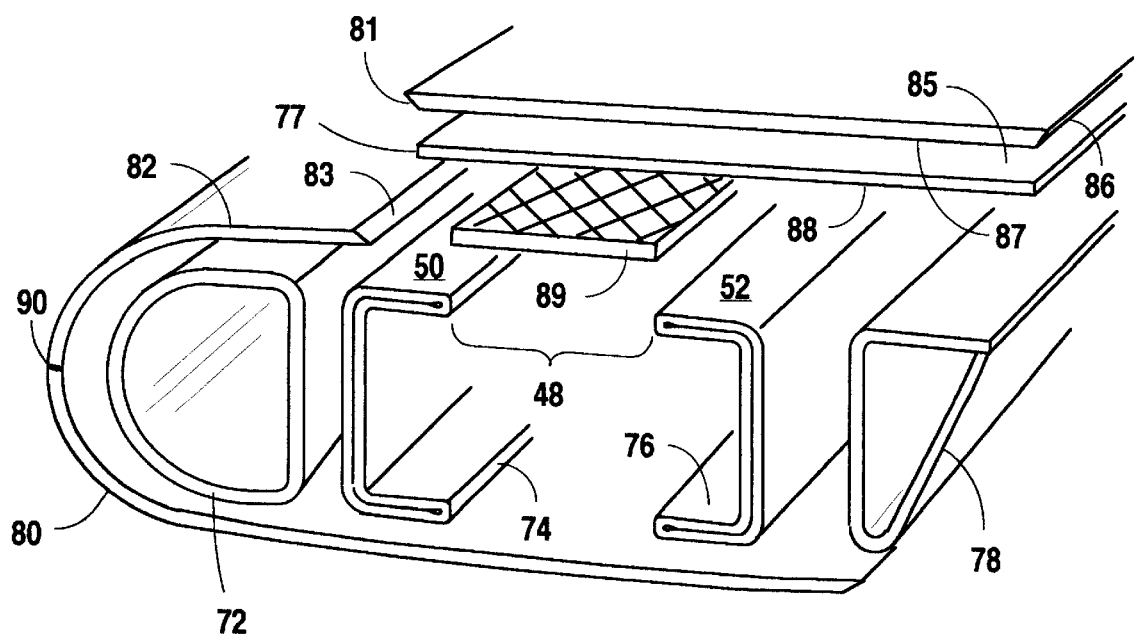
FIG. 5B is a simplified expanded view of components of a composite aircraft structure similar to FIG. 5A as would be placed within an RTM mold according to another embodiment of the disclosed method.

In one exemplary embodiment, dry fiber material 72 may be dry braided fiber sleeve to form a nose "D" cell, dry fiber materials 80, 82, and 84 may be dry fabric, dry fiber materials 74 and 76 may be dry fiber braided sleeves that are folded flat as shown in FIG. 5B, dry fiber material 78 may be dry fabric or alternatively dry fiber braided sleeve to form trailing edge, and separable skin 86 may be prepreg fabric in combination with unidirectional fiber tape for strength in longitudinal direction of wing.

As may be seen in FIG. 5A, integral open spaces exist between opposing ends of dry fiber material sections 74 and 76 on each opposing side of mandrel 66. Either or both of these openings may be employed to form an access space such as open area 48 illustrated in FIG. 3. Further, support lips 50 and 52 of FIGS. 3 and 4 may be formed from exposed ends of dry fiber material 74 and 76 as shown. Alternatively, an access space (e.g., open area) may be formed after RTM processing in a cured closed surface (e.g., such as in the cured closed surface formed from dry fiber braided sleeve material 72) by tooling (e.g. cutting grinding, etc.).

As may be seen in FIG. 5A, outer dry fiber material sections 82 and 84 are dimensioned and placed such that ends of inner fiber material sections 74 and 76 are exposed to form support lips 50 and 52 illustrated in FIGS. 3 and 4, and to provide an integral open area 48 shown in FIG. 3. Prior to placement of outer fiber material section 86 that will form the separable skin section 44 of FIGS. 3 and 4, resin transport film or layer 89 and separating film or layer 88 are placed over the surface of mandrel 66 in the order shown to cover open area 48 existing between portions of dry fiber material sections 74 and. 76 that will form support lips 50 and 52 as shown in FIG. 5A. In this embodiment, separating film 88 is suitably dimensioned to substantially cover the entire exposed surface of mandrel 66 and extend to contact the exposed surface areas of dry fiber material sections 74 and 76, as well as exposed edges of dry fiber material outer section 84 and 82 such that separating film 88 substantially isolates fiber material section 86 (which will become separable skin 44 of FIGS. 4 and 5) from contact with resin introduced below separating film 88 and/or from contact with adjacent dry fiber material sections 89, 82, 74, 76, 84, or with mandrel 66. It will be understood with benefit of this disclosure, however, that although complete isolation of fiber material section 86 from the adjacent dry fiber material sections 89, 82, 74, 76, 84 is possible (including isolation of edges of sections 82 and 84 from adjacent edges of section 86), it is not required as long as the resulting cured composite skin and composite substructure formed therefrom are substantially separable in a manner as described elsewhere herein. As shown, resin transport film 89 is disposed between separating film 88 and the composite substructure, and in contact with a portion of dry fiber material sections 74 and 76 to form a resin flow path or bridge across open area 48, and ensure resin saturation of dry fabric material sections on the side of open area 48 away from the resin inlets of mold 60.

FIG. 5B is an expanded view (mandrels and mold not shown) of components of a composite aircraft structure similar to FIG. 5A as would be placed within RTM mold 60 showing relationship therein of fiber material components, resin transport film 89, and separating film 88 according to another embodiment of the disclosed method in which separable skin 86 is dimensioned to extend completely to the trailing edge of the composite structure, so as to replace dry fabric section 84. As may be seen resin transport film is suitably dimensioned to span open area 48 and to contact the edges of respective dry fabric material sections 72 and 76 in order to provide a resin transport path therebetween. FIG. 5B also shows folded braided fiber sleeves 72 and 76 in further detail as they may be folded over in place. Resin transport film 89 may be any material (e.g., dry fabric or other material) suitable for providing a resin path across an opening between adjacent dry fabric materials, and which is suitable for transmitting resin pressure to separable skin component 86 through separating skin 88. In one exemplary embodiment, resin transport film 89 may be a disposable coarse weave cloth (e.g., 5 harness fiberglass material) that may be cut/broken away after cure from the edge of adjacent RTM-cured fiber materials 72 and 76. In an embodiment not shown, edges of separating film 88 may be turned up in a manner so as to substantially separate or isolate edges of dry fiber materials 82 and 84 from contact with respective adjacent edges of separable skin material 86 during resin injection and curing so as to help prevent formation of bridges of resin (or resin "flash") between fiber materials 82 and 84 and separable skin material 86. However turning up the edges is not necessary and, as described elsewhere herein, resin bridges or resin flash that may form may be broken or cut away and the composite structure surfaces dressed following separation of the composite structure parts.

In order to allow separable skin 44 of FIGS. 3 and 4 to separate from finished composite substructure 31 after cure, a non-bondable separating film 88 is laid between the fiber material 86 that will form the desired separable skin and the adjacent skeleton substructure areas, and is left in place throughout the RTM process and cure cycle. In this regard, separating film 88 may be manufactured of any relatively thin material suitable for substantially isolating fiber material section 86 from RTM resin materials that are injected into mold 60 to impregnate adjacent fiber material sections 82, 74, 76, and 84 in a manner described elsewhere herein, and to which the injected RTM resin will not adhere during curing. Examples of materials suitable for use as separating films include, but are not limited to, TEFLON® tetrafluoroethylene-based materials (available from, for example, Dupont Company), TEDLAR® polyvinyl fluoride-based materials (available from, for example, Dupont Company), etc. Thickness of such materials may be selected to be substantially thinner than the adjacent dry fiber material sections which it contacts, so that substantially no interference occurs with the fit between fiber material section 86 and adjacent dry fiber material sections 76, 74, 82, and 84, or in other words so that a substantially perfectly matching fit is achieved between separable skin 44 and skins 40, 42 and lips 50 and 52 of the cured structure. In one exemplary embodiment, Tedlar® film having a thickness of from about 0.001" to about 0.003" may be employed as separating film 88 in combination with dry fiber material sections 76, 74, 82, and 84 having a thickness of from about 0.008" to about 0.050", and plain prepreg material 86 having a thickness of from about 0.008" to about 0.050". This would normally inhibit the ability of liquid injected resin to pass through the separation film and efficiently "wet" the separable skin. Therefore, in the separable skin method, pre-impregnated fiber materials (as opposed to dry fiber to be injected with wet resin in the mold) are used to build up the plies necessary for the separable skin. As an example of a fit that may be achieved in one exemplary embodiment of the disclosed method, a substantially uniform gap of less than or equal to about 0.006" may be achieved between a separable skin and corresponding substructure components at the mating surfaces between the separable skin and the substructure.

Although FIGS. 3–5B show a joint 90 formed between two dry fiber material layers 80 and 82 that will form fixed outer layer 40 of composite part 30, it will be understood that a single fiber material piece may be employed instead. When a single dry fiber material piece is employed, a portion of the fiber material may be laid into the first mold half 62 with the remaining portion draping over the edge of the mold half and laying outside of the mold cavity. After the fiber material covered mandrels are placed on top of the dry fiber material outer layer that is in first mold half 62, the overlapping portion of dry fiber material outer layer may be folded back over onto the top of mandrels 64 and 66 as shown in FIG. 5A, prior to placement of separating film 48 and outer fiber material layer 86. When such a single outer fiber material section is employed, a joint 90 would not exist. This methodology is also described in relation to the embodiment of FIG. 6.

Although FIG. 5A has been described in relation to an embodiment of the disclosed single-cure RTM process in which fiber material sections are applied to mandrels and/or mold halves by hand, it will be understood with the benefit of this disclosure that machine applied fibers may also be employed, for example, utilizing techniques such as those described in U.S. patent application Ser. No. 08/790,559 filed Jan. 29, 1997, which is incorporated herein by reference. For example, fiber placement methods and machines may be employed to place fiber material around mandrels 65, 66, and/or 68, prior to insertion into mold 60 if so desired. Furthermore, prepreg materials may also be placed by machine, such as a prepreg fiber layer 86 disclosed in FIG. 5A. In such a case, prepreg fibers may be disposed around another mandrel to form the separable skin section (e.g., a very flat, thin mandrel) prior to placement of the prepreg coated mandrel against separating film 88 in mold 60. In any case, dry fiber material and/or prepreg materials may be fiber placed by machines in any suitable manner known in the art, as long as the fiber material remains suitably attached and/or sealed to the mandrel or mold half to allow insertion and placement within mold 60 prior to closing the mold and proceeding with the RTM process described elsewhere herein.

As previously described, second mold half 64 is placed over first mold half 62 and the mandrels and over the associated dry fiber material which will form the composite structure upon curing. The mold is then placed into a press (e.g., using a crane or other lifting device if necessary) which exerts pressure to hold mold halves 62 and 64 together in sealing relationship. Ends of mold half 62 and 64 may be sealed using mold end caps that are described in relation to the embodiment described in relation to FIGS. 9–11. In the illustrated embodiment, mold halves 62 and 64 are configured to create a clearance of between about 0.05 inches and about 0.75 inches, depending on the strength requirements, between the interior surface of the mold halves and exterior surface of the mandrels placed therein. Seals may be provided at joining or sealing surfaces 98 of the two mold halves to form a sealed leak-free system, once the mold halves are assembled together. Examples of such seals include, but are not limited to, silicone, butyl rubber, neoprene, etc.

Figure 5C:
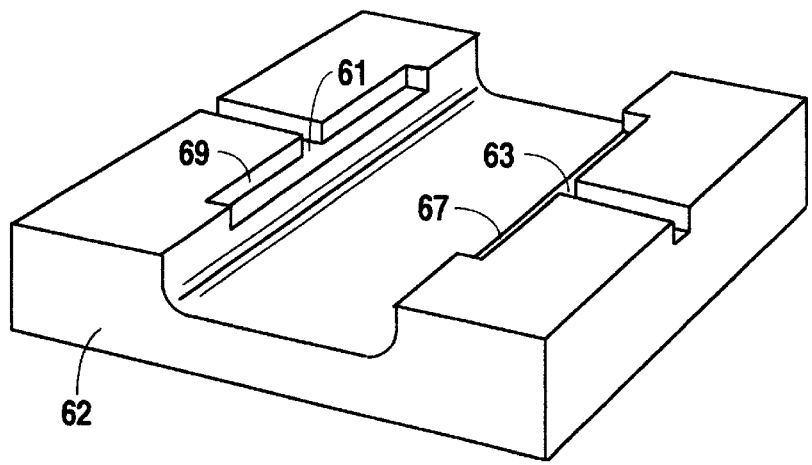
FIG. 5C is a simplified perspective view of a RTM mold half showing resin inlets and outlets configured as channels according to one embodiment of the disclosed method.

In one embodiment of a single-cure RTM process, the mold may be heated prior to and during injection of resin material, although this may not always be necessary. Heated resin is introduced into the mold to contact the dry fiber material sections through inlets located on one side of the mold under pressure and forced to flow through the dry fiber material sections positioned in the spaces created between the mold interior and the mandrel exterior. In this regard, any resins suitable for injection and curing within an RTM process may be employed. Type of resin may be selected based on characteristics of particular components employed (curing conditions of prepregs, temperature sensitivity of filler materials, etc.) and desired characteristics of finished composite structure (strength, etc.). Higher temperature-curing resins include those that cure at temperatures of, for example, from about 250° F. to about 400° F., although other curing temperature ranges may be selected as so desired. Specific examples of suitable injectable resins include, but are not limited to, "PR"-series resins available from 3M Company As shown in FIG. 5C, resin inlet 61 and/or outlet 63 may be configured, for example, as channels that longitudinally span the respective front 69 and rear 67 of a mold so as to help evenly disperse the injected resin. A vacuum may be drawn prior to resin injection to help ensure no voids due to trapped air pockets. The resin flows through these spaces, uniformly saturating and impregnating the dry fiber material, and exits the mold through resin outlets positioned on the opposite side of the mold. Resin is introduced to flow through the mold in a manner such that fiber material section 86 is isolated from the resin flow by means of separating film 88, which is selected to be substantially impermeable to the resin. Thus, the injected resin saturates substantially all fiber sections existing between the mandrels and mold interior with the exception of fiber material section 86 which is to form the separable skin 44 of FIGS. 3 and 4. Because the resin is substantially prevented from directly contacting the inner surface 87 of fiber material section 86 that is disposed adjacent and in contact with outer surface 85 of separating film 88, section 86 remains an independent part which is substantially separable from the remainder of the structure upon removal from the mold. As described elsewhere herein, bridges of removable resin or resin flash may exist following curing, for example, between the edge 81 of fiber material section 86 and the edge 83 of fiber material layer 82, joining these components together. Such resin bridges may be broken or cut away and the mating surfaces/edges dressed as necessary to achieve the desired fit after curing. In one embodiment, when edge 77 of separating film 88 is turned upward or otherwise positioned to be disposed between edges 81 and 83, formation of such bridges may be substantially avoided if so desired.

When resin appears at the mold outlet/s, the outlet/s is clamped or shut-off, hydraulic pressure applied via the inlets, and the mold temperature increased to the cure temperature. Once duration of the gel time is completed, the resin inlet/s is also clamped or shut-off in order that the resin pump may be disconnected and prepared for the next RTM cycle. Following curing and upon opening of a mold having resin inlets and/or outlets that are configured as channels, pockets of cured resin (resin "flash") may be attached to the cured composite structure. Since such resin flash is non-fiber containing, it is normally removable simply by breaking or cutting it away from the composite structure. The surface of the structure may then be dressed by grinding or other suitable tooling method to eliminate any roughness or other surface anomaly that results from removal of the resin flash.

Fiber material section 86 may be separately impregnated with resin using a separate system of resin inlets and outlets located in upper mold half 62 in a manner similar to that described for the lower mold half 64. In such a case, any system or configuration of resin inlets and outlets may be employed that is suitable for injecting and saturating fiber material section 86 without allowing the same resin to contact the fiber material sections positioned below separating film 88. For example, a first pair of separate resin inlets and resin outlets as described above may be provided on one side of separating film 88 to provide a resin path for saturating fiber material section 86. Resin injection occurring beneath separating film 88 should also occur in a manner suitable for saturating those fiber material sections below separating film 88 without contacting fiber material section 86. For example, a second pair of separate resin inlets and resin outlets separate from the first pair may be provided on the side of separating film 88 opposite the first pair of resin inlets and outlets to provide a separate resin path for saturating fiber material sections below separating film 88. Thus, fiber material section 86 may be separately and independently saturated with injected resin in any manner suitable for maintaining substantial isolation between resin injected above and below separating film 88.

In an alternate embodiment, fiber material section 86 may be a pre-impregnated "prepreg" fiber material that is placed above or on top of separating film 88. In this embodiment, heated resin would only be injected into the mold cavity spaces existing below separating film 88. Thus, all parts of the composite structure would be formed by single-cure RTM resin injection, with the exception of the separable skin 44 of FIGS. 3 and 4, which would be instead formed from a prepreg material used for fiber material section 86 illustrated in FIG. 5A. When a prepreg fiber material is employed to create a separable skin, any prepreg material that is curable under the same conditions as the RTM injected resin within a mold 60 may be employed. Examples of specific suitable prepreg fiber material materials include, but are not limited to, carbon fiber or glass fiber epoxy resin combinations. During the RTM injection process the liquid injected resin wets the dry fibers of the dry fiber material sections on one side of the separating skin 88 and also applies hydraulic pressure through the separating film 88 so as to compact the prepreg materials used in the skin. When the mold temperature is raised to the resin cure temperature, both the injected resin and the prepreg resin may be selected to have similar curing conditions (cure time, temperature, etc.) so that they simultaneously cure even though they are of two different resin formats.

In those embodiments utilizing pre-resin saturated prepreg materials as separable skin component 86, it is believed that injected resin does not travel or move into the prepreg material due to differential displacement pressure that favors a flow path through the dry fabric components. Thus, it is acceptable that areas of minor contact may exist between a prepreg material used for separable skin component 86 and adjacent dry fabric materials of the substructure (e.g., at the edges) during the RTM process since any cured resin that may be present between the edges of such components may be broken or cut away after cure, without affecting the quality of the completed structure.

Any type of resins suitable for injection and curing in an RTM process may be employed including, but not limited to, "PR500" and "PR520" resins available from 3M Company, Cytec 823 or 890 from Cytec-Fiberite, or Shell 862/W from Shell Chemical of Houston. In one example employing Newport NB321 from Newport Adhesives & Composites Inc. of Irvine, Calif. prepreg material in combination with Cytec 823 resin, the mold may be preheated to a temperature of from about 150° F. to about 170° F., and a vacuum of from about 26 inches to about 28 inches also drawn within the mold prior to resin injection. Heated resin may be injected into the RTM mold at a pressure from about 30 psi to about 60 psi, although any pressure suitable for flowing resin through the mold spaces and cavity spaces in order to saturate the fiber material therein may be employed. Within the closed and sealed mold heated resin may then be injected into selected areas of the mold through resin inlets (not shown) at a pressure of from about 30 psi to about 60 psi to contact and impregnate dry fiber material skins and braided dry fiber material sleeves surrounding mandrels within the mold interior. Temperature of the heated resin may be any suitable temperature for the particular resin materials employed, however, is from about 80° F. to about 100° F. for Cytec 823 resin.

Once the fiber material components have been exposed to heated resin within the mold such that the dry fiber material is saturated with a suitable amount of resin to form a cured product (as may be evidenced by appearance of resin a the resin outlet/s). The mold outlets are then sealed and hydraulic pressure applied to resin and the interior of the mold. In this regard, a hydraulic pressure from about 30 psi to about 60 psi may be maintained on the resin impregnated fiber material structure for from about 1 to about 3 hours. Temperature of the mold may then increased to curing temperature of from about 260° F. and 280° F., e.g., for a period of from about 1.5 hours to about 2.0 hours. Sufficient pressure is applied by the press to maintain the mold halves in close sealing relationship while resin is injected and pressure is applied within the mold. It will be understood with benefit of this disclosure by those of skill in the art that specific combinations of time, temperature, pressure and mold press closure pressure may be varied as necessary to fit particular resin and/or materials employed, and/or to develop the desired properties of cured composite structure.

After sufficient curing time has passed, the mold 60 is removed from the press and the mold halves 62 and 64 separated. In one embodiment, second mold half 64 is lifted away or removed while mold components are still hot so as to prevent the mold halves from cooling and contracting in a manner such as to compress or trap the composite structure parts within the mold. Then the cured composite part is removed, with mandrels intact, from the mold while still warm or hot and then allowed to cool prior to removing the mandrels, for example, by longitudinally sliding them out from one end of the cured composite structure. In this regard, allowing the mandrels to cool prior to removal makes removal easier due to mandrel contraction during cooling.

Referring back to FIG. 3, following removal of the mandrels from the cured composite structure, separable skin 44 may be removed and separated from the skeleton substructure by virtue of separating film 88, which may then be discarded. In this regard, cured separable skin 44 may be removed from the substructure with finger pressure. As may be appreciated from FIGS. 3–5, when so formed, separable skin 44 is dimensioned so as to form a substantially perfect match with the substructure when separable skin 44 is placed into and mated with open area 48. The reassembly of separate skin 44 to the substructure may be affected with rivets and /or adhesive. In some cases, adhesive assembly may be selected as it is more efficient and does not require sealing of rivets against fuel leakage. Further, when adhesive assembly is employed, the match between separable skin and substructure components is improved.

The following steps described in relation to FIGS. 6–14 are illustrative of another exemplary embodiment of the disclosed RTM process and apparatus used therewith to manufacture a composite aircraft wing structure. It will be understood that other embodiments are possible, including those embodiments using fewer, additional and/or differing materials and steps.

Figure 12:
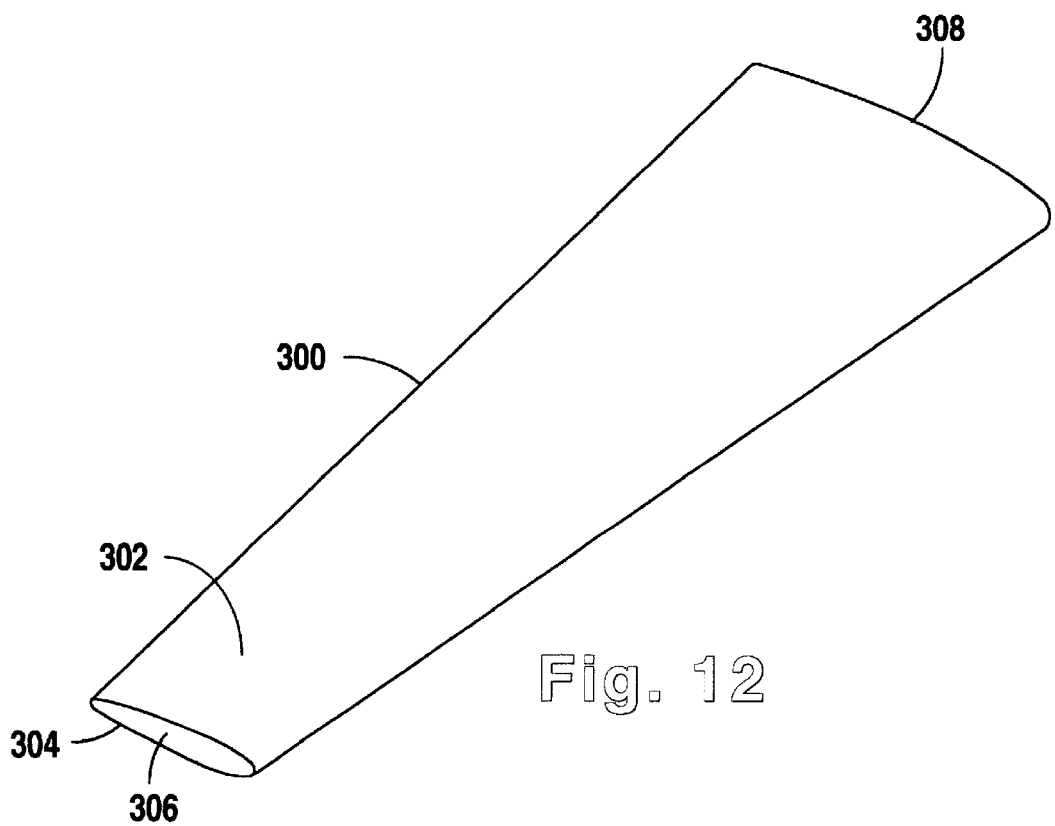
FIG. 12 is a simplified perspective view of a composite aircraft left wing structure as removed from the RTM mold of FIG. 11 and fabricated with a separable skin using a RTM process according to one embodiment of the disclosed method.
Figure 13:
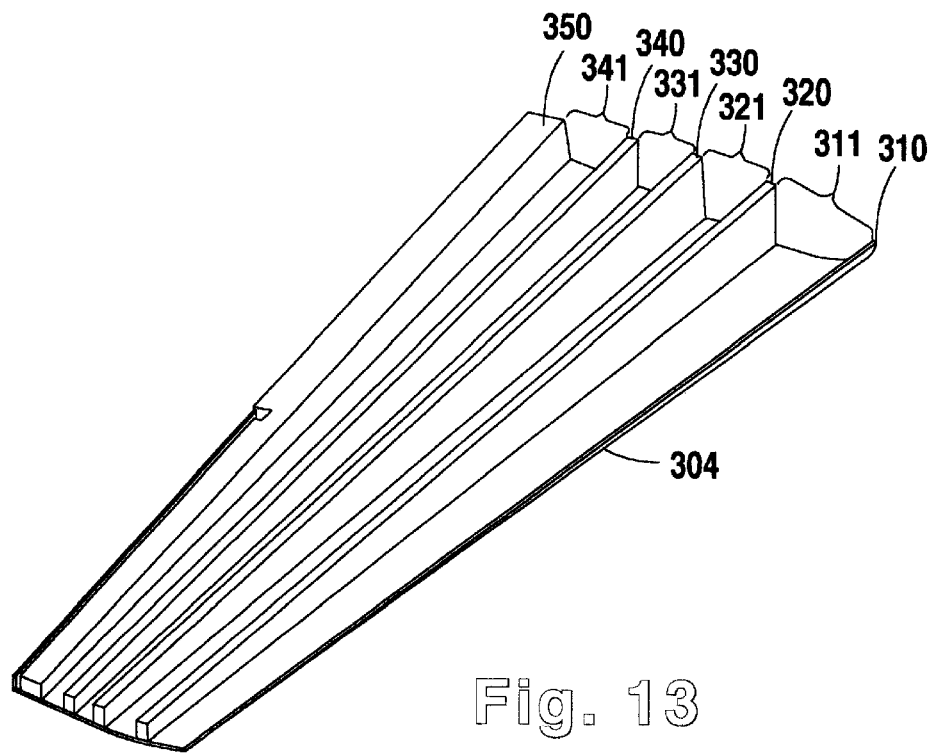
FIG. 13 is a simplified perspective view of the composite aircraft left wing structure of FIG. 12 shown with separable skin removed according to one embodiment of the disclosed method.
Figure 14:
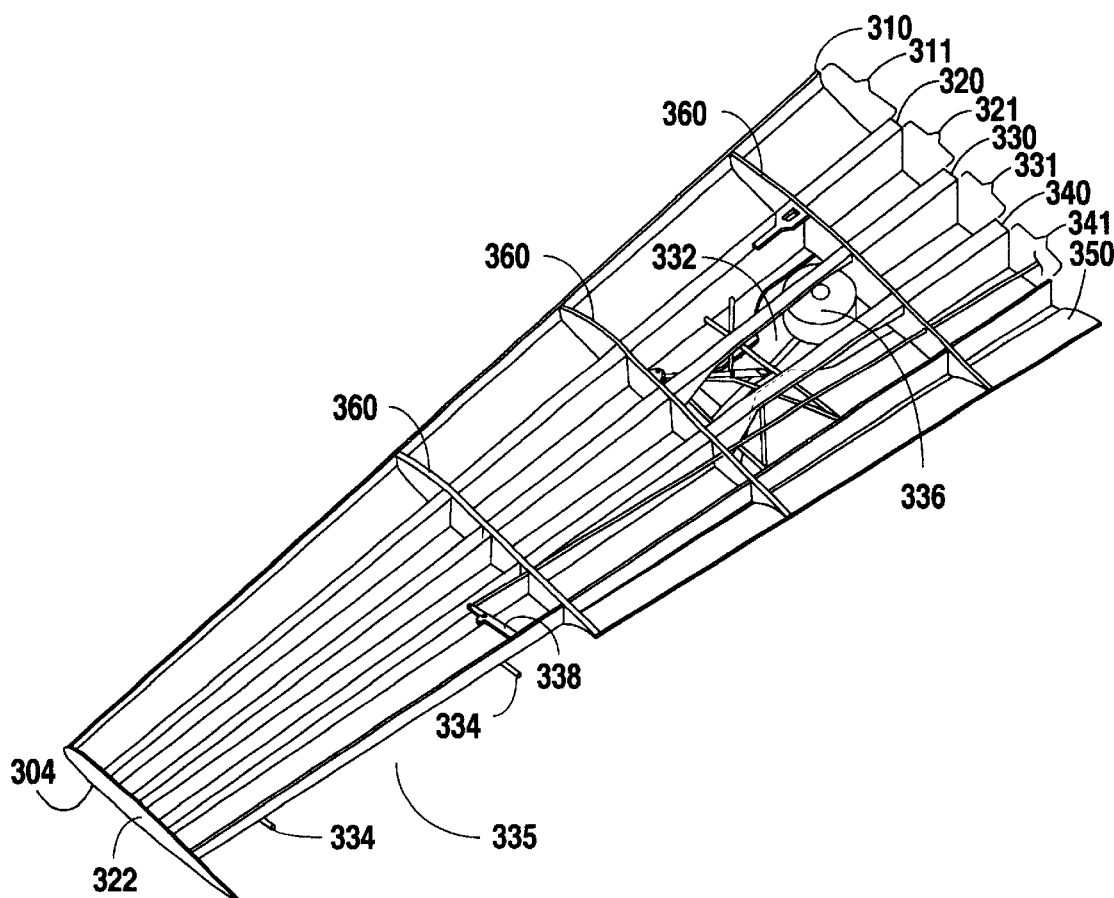
FIG. 14 is a simplified perspective view of a composite aircraft left wing structure corresponding to the composite aircraft right wing structure of FIG. 13 shown with separable skin removed and internal components installed according to one embodiment of the disclosed method.

FIGS. 6–14 illustrate another embodiment of the disclosed RTM process used to fabricate a composite aircraft wing structure having a separable skin section that includes substantially the entire upper skin surface of the wing structure. In this regard, FIGS. 6–13 show a right composite aircraft wing structure, while FIG. 14 shows a left composite aircraft wing structure of the same design for the same aircraft, and having the same overall shape and dimensions as the right wing structure. Unless indicated otherwise, similar materials, tools and processing conditions as described in relation to the embodiment of FIGS. 3–5 may also be employed with the embodiment of FIGS. 6–14.

Figure 6:
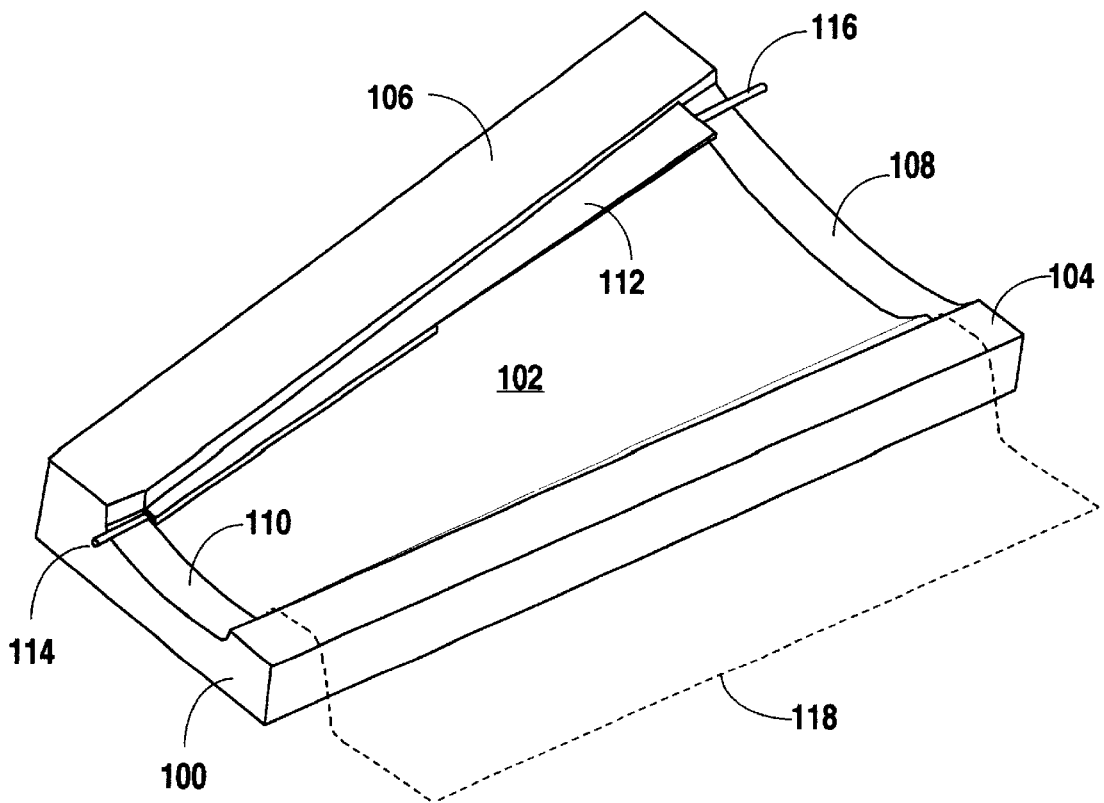
FIG. 6 is a simplified perspective view of a first RTM mold half with a first fiber material skin disposed therein according to one embodiment of the disclosed method.

FIG. 6 shows a first RTM mold half 100 with a first dry fiber material skin 102 laid up on an inner surface of the first mold half that forms and controls the outer mold line ("OML"). Mold half 100 is provided with first and second sealing surfaces 104 and 106 for sealable mating with a corresponding second mold half 200 (shown in FIG. 11). In the illustrated embodiment, mold halves 100 and 200 provide a rigid form upon which pliable uncured dry fiber materials may be placed and supported during an RTM injection and curing process, which is carried out under controlled and elevated temperate and pressure. In operation, respective halves of a clam shell mold are typically held together with clamps during molding and curing of a composite part section. As previously described, seals may be provided at sealing surfaces 104 and 106 to form a sealed leak-free system, once the mold halves are assembled together.

An optional trailing edge spacer 112 is shown positioned adjacent second sealing surface 106 and serves in this case to form the shape of an open trailing edge "C" in the finished composite wing structure to which hardware of control surfaces may be attached. Trailing edge spacer 112 may be manufactured of similar materials as mandrels employed in the disclosed method, and is not covered with fabric. Trailing edge spacer 112 is shown provided at each end with spacer supports 114 and 116 that are received in open end sections 108 and 110 of mold half 100 as shown. First dry fiber material skin 102 may be placed within mold half 100 in any suitable manner, for example, by hand lay up.

Although FIG. 6 shows outer dimensions of first dry fiber material skin contained entirely between inner dimensions of sealing surfaces 104 and 106, it will be understood with benefit of this disclosure that a first dry fiber material skin section may be optionally suitably dimensioned with extra material so as to extend over and beyond one or both of outside sealing surfaces 104 and 106 (for example as shown by dotted lines 118). When so dimensioned, the extra fiber material ply material may be folded back over the uncured composite structure prior to joining separate mold halves 100 and 200 to provide a seamless leading and/or trailing edge of the finished structure. In this regard, FIG. 5A shows a composite wing structure surrounded by joined mold halves and having a seamless leading edge skin formed from a first dry fiber material skin having sufficient length to extend from the underside of the wing section and wrap around the leading edge as shown.

Figure 7:
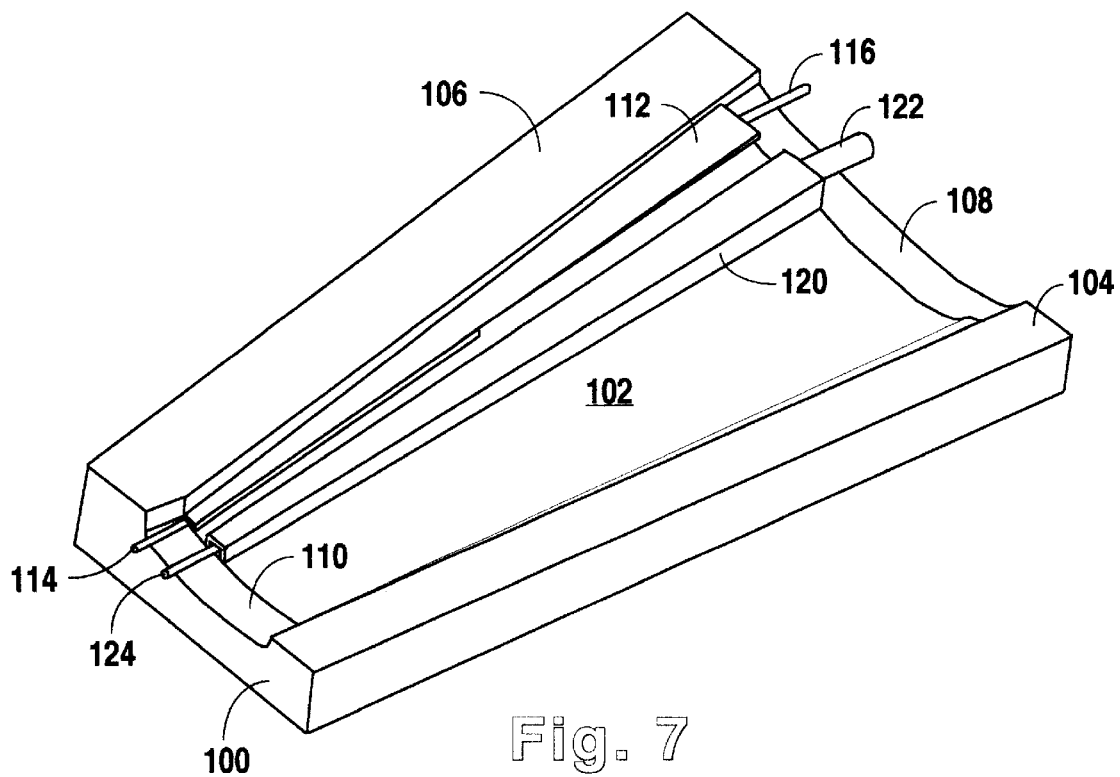
FIG. 7 is a simplified perspective view of a first RTM mold half with a first fiber material skin and a fiber material covered mandrel disposed therein according to one embodiment of the disclosed method.

FIG. 7 shows first dry fiber material-covered mandrel 120 in place within first RTM mold half 100. Relatively long mandrels may be laid within mold half 100, for example, using a spatula-like flat movable support. As previously mentioned, such a mandrel may be partially or completely covered with any dry fiber material suitable for use in an RTM process. In the embodiment of FIG. 7, the main body of mandrel 120 may be covered with a braided fiber material sleeve in a manner, for example, as illustrated by mandrel 65 and dry fiber material 72 in FIG. 5A. In such a case, the length of the sleeve may correspond to the respective longitudinal length of dry fiber material first skin 102 so that the ends of these separate materials are flush at the composite structure edges adjacent end sections 108 and 110 of mold half 100. Alternatively, mandrel 120 may be partially covered with fiber material so as to form one or more open spaces in a manner, for example, as illustrated by mandrel 66 and dry fiber material sections 74 and 76 in FIG. 5A.

Figure 8:
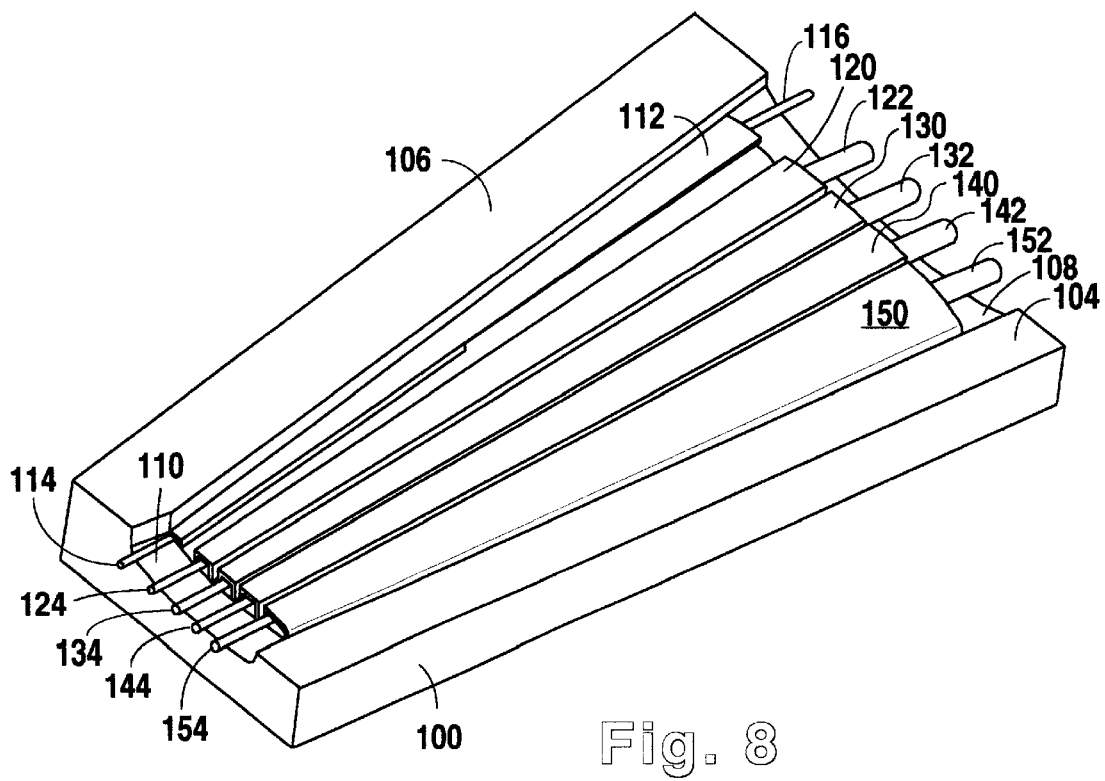
FIG. 8 is a simplified perspective view of a first RTM mold half with a first fiber material skin and four fiber material covered mandrels disposed therein according to one embodiment of the disclosed method.

As shown, mandrel 120 is provided with mandrel supports 122 and 124 that are received in open end sections 108 and 110 of mold half 100 as shown. FIG. 8 shows additional dry fiber material-covered mandrels 130, 140 and 150, having respective mandrel supports 132, 134, 142, 144, 152 and 154, positioned in place within first RTM mold half 100. As illustrated in FIG. 5A and as described above in relation to mandrel 120, each of respective mandrels 132, 134, 142, 144, 152 and 154 independently may be completely or partially covered with dry fabric material (e.g., completely covered using dry fabric material braided sleeve, and/or partially covered using dry fabric material sections so as to form one or more open areas therebetween). As previously described in relation to FIG. 5A, when a mandrel is completely covered with dry fabric material, one or more open areas may later be formed in the resulting hollow cured structure by tooling (e.g., cutting, grinding, etc.). Alternatively one or more open areas may be integrally formed within the cured substructure without the need for later tooling by partially covering a mandrel with dry fabric material.

As may be seen in FIG. 8, the outer dimensions of individual mandrels are shaped to control the shape of the interior surface or inner mold line of the composite structure skin that may be formed from fiber material when cured. In this regard, outer dimensions of mandrel 154 form the shape of a wing leading edge. The inner dimensions of each of mold halves 100 and 200 are shaped complimentary to the mandrel outer dimensions and serve to control the outer surface or outer mold line of the composite structure skin, in this case a wing.

Figure 9:
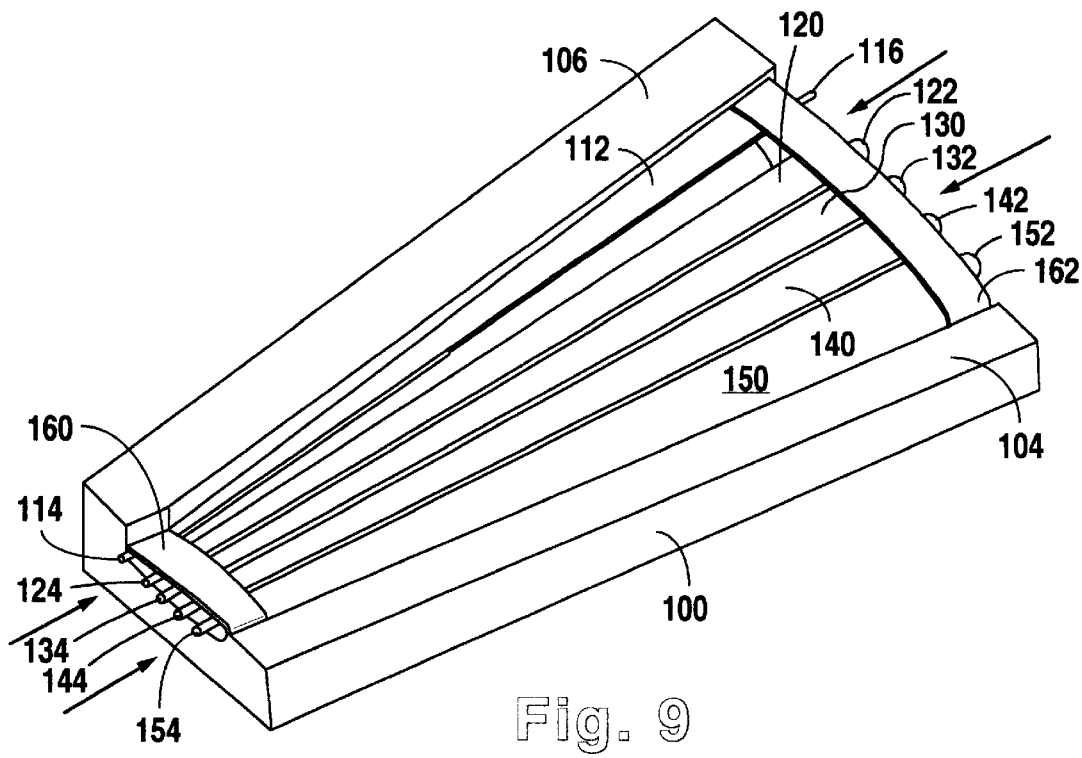
FIG. 9 is a simplified perspective view of the first RTM mold half of FIG. 8 with mold end caps installed according to one embodiment of the disclosed method.

FIG. 9 shows first and second mold end caps 160 and 162 positioned in place within respective open end sections 110 and 108 of mold half 100. Mold end caps 160 and 162 have outer dimensions complimentary to dimensions of open end sections mold halves 100 and 200. As shown, mold end caps 160 and 162 have mold mandrel support openings suitably dimensioned to sealably receive and support or suspend respective supports 114, 116, 122, 124, 132, 134, 142, 144, 152 and 154. End caps 160 and 162 may be manufactured from any material suitable for sealably mating with first and second mold halves 100 and 200 n a manner so as to seal open end sections 110 and 108 when the mold halves are sealably assembled together. For example, end caps 160 and 162 may be manufactured from metal (e.g., aluminum, steel) or non-metal that will tolerate process temperature and pressure (e.g., phenolic material), and form a seal with the mold halves 100 and 200 using, for example, silicone, butyl rubber, neoprene, etc. A seal between openings in end caps 160 and 162 and respective supports 114, 116, 122, 124, 132, 134, 142, 144, 152 and 154 received in the openings may be formed by virtue of similar sealing materials.

End caps 160 and 162 may be configured to be slidable over the ends of the supports, for example, as shown in the direction of the arrows in FIG. 9. End caps 160 and 162 may be one piece or may be made up of multi-piece sections, with one section configured to mate or slide over a respective individual support. End caps 160 and 162, and the openings formed therein, are also suitably configured to support and suspend dry fiber material-covered mandrels 120, 130, 140 and 150 in controlled spacing relationship to the interior surfaces of first and second mold halves 100 and 200 so that the dry fiber material is not compressed between the mandrels and the interior surfaces of the mold halves, for example, due to weight of the mandrels. This spacing relationship helps promote even and unimpeded resin flow and saturation of the dry fiber material during the RMT process. In one embodiment, composite structure skin having a thickness of about 0.05" is formed from about 0.05" thick braided fiber material sleeves surrounded the mandrels, and a controlled spacing of about 0.05" for the fiber material thickness is maintained between exterior surfaces of the mandrels and the interior surfaces of the mold halves.

Figure 10A:
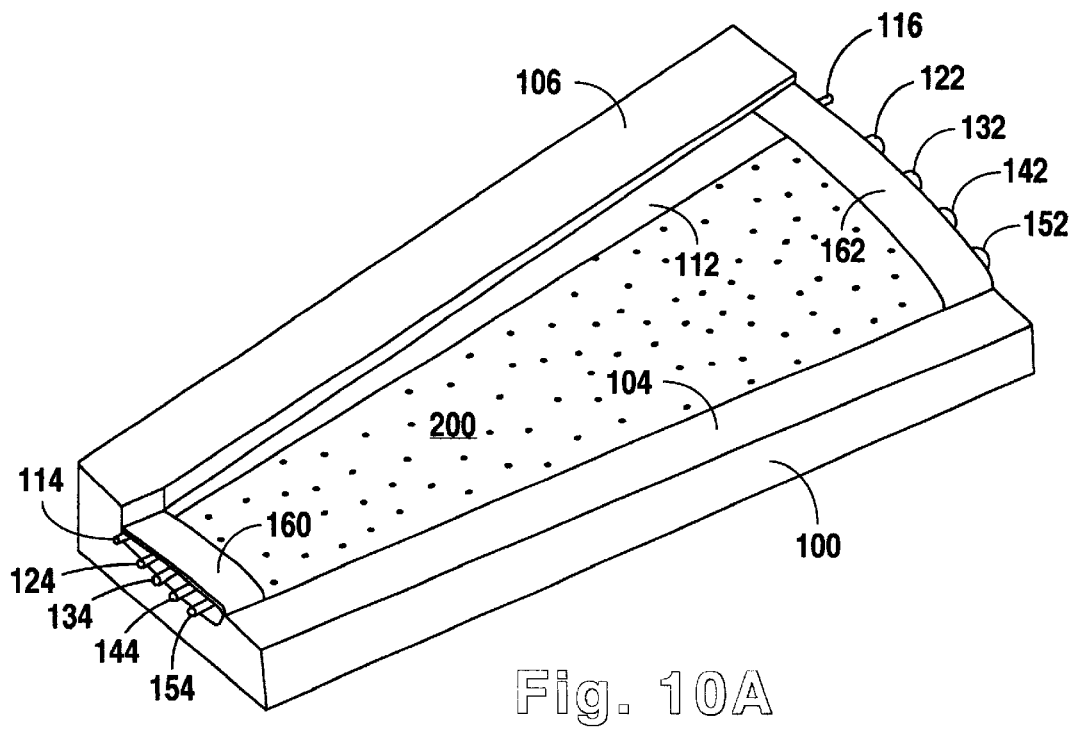
FIG. 10A is a simplified perspective view of the first RTM mold half of FIG. 9 with a separating film shown disposed over dry fiber material covered mandrels according to one embodiment of the disclosed method.
Figure 10B:
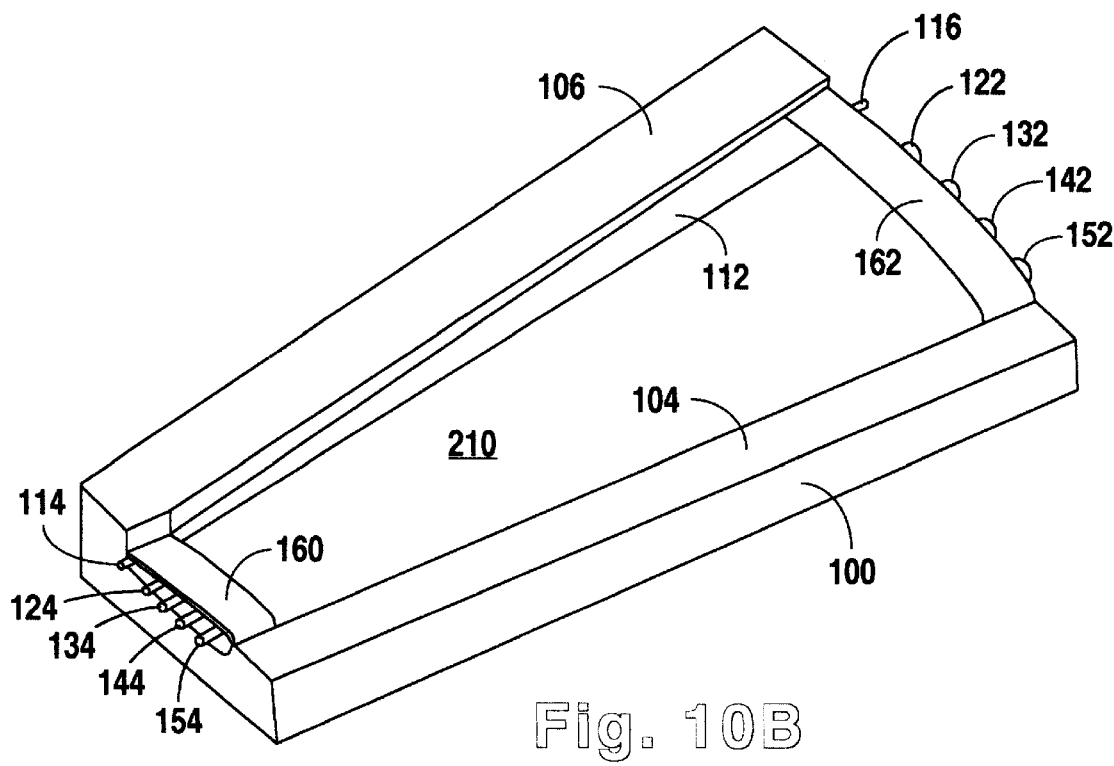
FIG. 10B is a simplified perspective view of the first RTM mold half of FIG. 9 with a separating film and second fiber material skin shown disposed over dry fiber material covered mandrels according to one embodiment of the disclosed method.

FIG. 10A shows separating film 200 in place over dry fiber material covered mandrels 120, 130, 140 and 150. FIG. 10B shows second fiber material skin 210 disposed over separating film 200. Separating film 200 is placed as previously described to substantially prevent injected resin from penetrating above the surface of separating film 200 to contact second fiber material skin 210 during the RTM process. In this embodiment, second fiber material skin 210 is to form a separable skin 302 upon RTM processing and cure. As previously described, second fiber material skin 210 may be pre-impregnated resin prepreg material that is selected to have curing properties such that it cures during the RTM process cure cycle. When second skin 210 is selected to be of prepreg material, RTM mold resin injection plumbing may be configured so that resin is only injected to contact and impregnate first dry fiber material skin 102 and the dry fiber material braided sleeves that surround mandrels 120, 130, 140 and 150. Alternatively, second fiber material skin 210 may be selected to be of a similar dry fiber material as first fiber material skin 102, in which case mold resin injection plumbing may be configured so that resin is also injected to contact and impregnate second skin 210, but in such a way that resin injected on either side of separating film 200 does not contact or intermix with resin injected on the other side of film 200, thus ensuring that fiber material skin 210 will be separable from the remainder of the structure after curing. In either case, it will be understood that other material types (e.g., non-fiber materials, mixtures of prepreg and dry fiber materials, etc.) may be employed as a part of skin 210 and/or 102.

Figure 15:
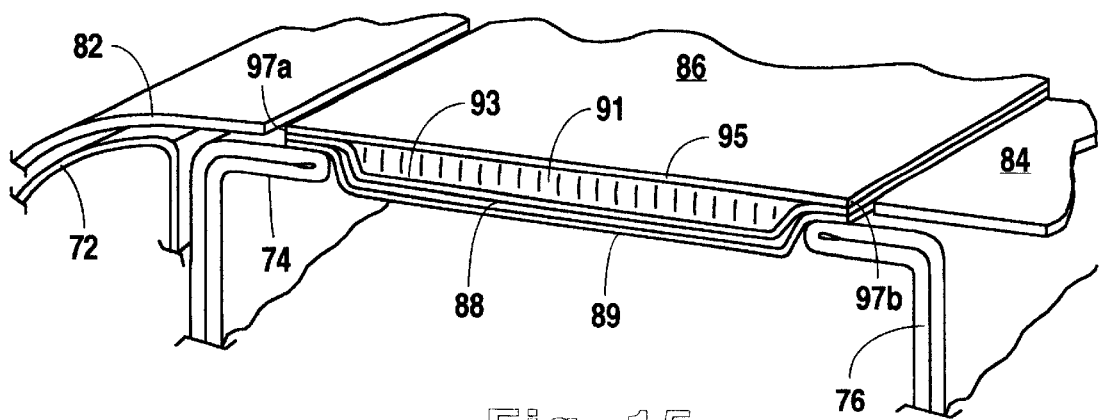
FIG. 15 is a simplified and partial sectional perspective view of a composite aircraft structure fabricated with a separable skin having a core of honeycomb material that is surrounded by first and second layers of laid up resin-impregnated prepreg material according to one embodiment of the disclosed method corresponding to embodiments illustrated in FIGS. 3–5A.

In one embodiment, second fiber material skin 102 may be constructed from a core of honeycomb material that is surrounded by one or more layers of laid up resin-impregnated prepreg material. Prepreg material that may be employed in this role, and which resist or substantially prevent passage of resin into the honeycomb core during the RTM process include, but are not limited to, prepreg materials available from suppliers such as Hercules and Fiberite. With benefit of this disclosure, such prepreg materials may be manufactured to include resins that have the same curing conditions as the selected RTM resin using methods known in the art. Honeycomb core may be fabricated in a number of ways, including in metallic form using, for example, aluminum, stainless steel or titanium foils, or in composite form using, for example, glass fabric, graphite fabric, or "KEVLAR" material in the form of "NOMEX." Honeycomb composite cores may employ phenolic resin matrix material. One example honeycomb core is made from "NOMEX" available from, for example, Hexcel, Plascore, and Ciba-Geigy. FIG. 15 illustrates one exemplary embodiment of a separable skin component 86 constructed from a core of honeycomb material 91 that is surrounded by first layer 93 and second layer 95 of laid up resin-impregnated prepreg material, and which corresponds to the embodiments illustrated in FIGS. 3–5A. As shown in FIG. 15, edges 97a and 97b of separable skin component 86 may be tapered or "panned down" to accommodate thickness of the honeycomb core and surrounding layers, while at the same time providing a separable skin that mates to form a uniform outer skin surface with surrounding skin components 82 and 84.

As previously described, the mold may be heated and a vacuum drawn within the mold prior to resin injection. Within the closed and sealed mold heated resin is injected under pressure to contact and impregnate dry fiber material skins and braided dry fiber material sleeves surrounding mandrels within the mold interior. Resin flow is terminated when resin appears at the resin outlet/s and hydraulic pressure applied. Temperature of the mold is then increased for curing, and the mold inlet/s sealed after duration of gel time.

Figure 11:
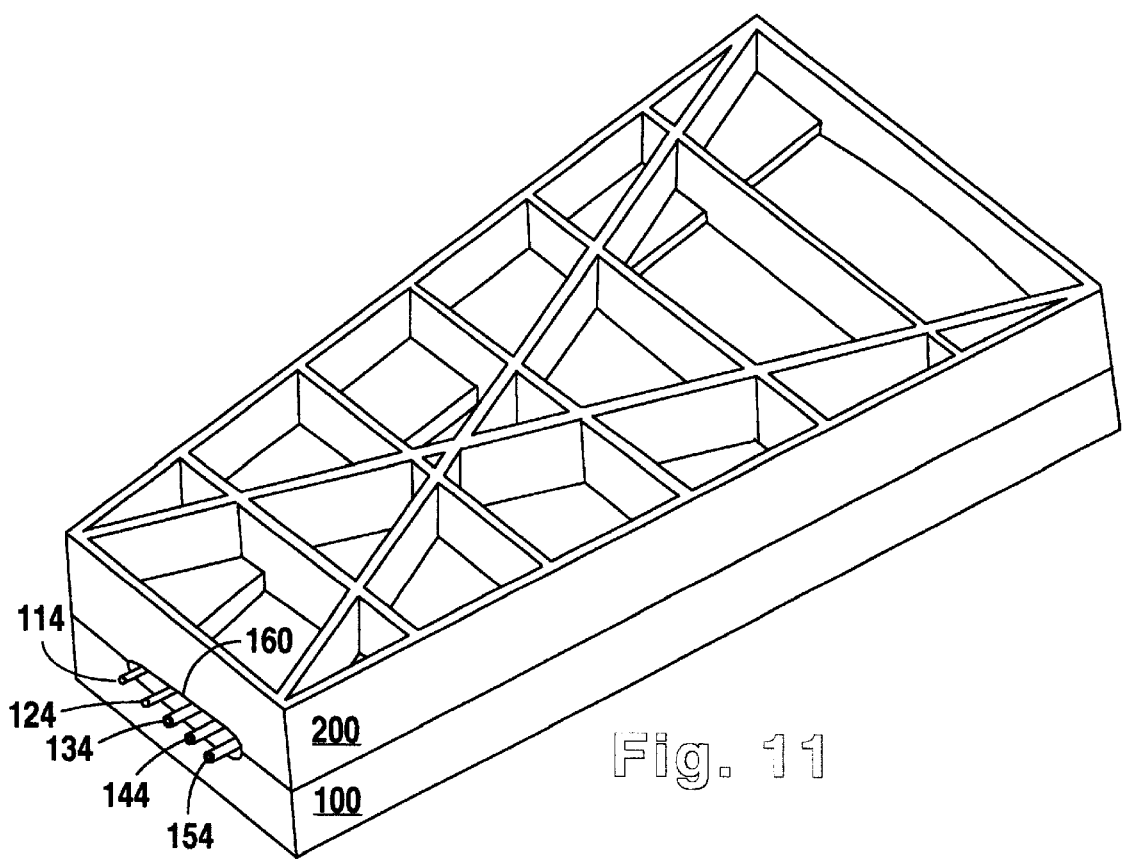
FIG. 11 is a simplified perspective view of an RTM mold assembled from a second RTM mold half and the first RTM mold half of FIG. 10 according to one embodiment of the disclosed method.

FIG. 12 shows composite aircraft wing structure 300 (corresponding to a right wing structure) as removed from the RTM mold of FIG. 11 after RTM processing and curing, with end caps, mandrels and trailing edge spacer removed. As shown, wing structure 300 includes separable skin 302 and a composite substructure 304. Separating film 200 is in place between these components when structure 300 is first removed from the mold halves and in some cases may be lightly attached at one or more points to the other components by small amounts of resin only (no fiber). When so attached, separating film 200 may be easily separated from the components by easily breaking or cutting it away at the points of attachment. End caps 160 and 162 may be removed from the composite structure by outward sliding the caps away from respective outboard and inboard ends 306 and 308 of structure 300 until they are clear of supports 114, 116, 122, 124, 132, 134, 142, 144, 152 and 154. Trailing edge spacer 112 may be removed by outward separation from structure 300. Mandrels 120, 130, 140 and 150 may be removed from inside structure 300 by longitudinally sliding each respective mandrel outward, for example from the inboard end 308 of cured structure 300 so that the thickest edge of the mandrel is removed first. Alternatively, internal mandrels may be removed following separation of separable skin 302 (see FIG. 13) where irregular shape of one or more mandrels prevents or inhibits longitudinal sliding of the mandrels out of the end of a cured structure.

FIG. 13 shows composite aircraft wing substructure 304 after removal of separable skin 302 so as to allow access to the interior of structure 300, e.g., for trimming operations and/or installation of equipment. As may be seen in FIG. 13, internal shape and dimension of leading edge 310, spars 320, 330 and 340, and trailing edge 350 have been formed by mandrels 120, 130, 140 and 150. Depending on the fiber material scheme employed to cover the mandrels, open areas 311, 321, 331, and 341 may be integrally formed during fiber lay-up and cure by placement of separate fiber material sections on the mandrels, and/or alternatively may be formed in a closed cured fiber material surface by tooling after curing and removal of separable skin 302 as previously described.

FIG. 14 shows composite aircraft wing substructure 304 with separable skin 302 removed (this time for a left wing structure), and after trimming operations and installation of internal components. Trimming operations may include, for example, trimming any rough edges present on the composite parts, cutting holes and trimming the edges of the exterior skin of substructure 304, cutting away portions of internal spars to make room for installed equipment, etc. In this regard, opening 335 is shown formed for control surface installation and landing gear opening 332 formed for deployment of landing gear. Spars 330 and 340 are shown trimmed to provide stowage room for landing gear components 336 within composite substructure 304. As shown, installed internal components may include, for example, internal rib sections 360, landing gear equipment 336, and control surface actuators 338. Control surface mounting equipment 334 is also shown installed in opening 335. With benefit of this disclosure, installation and trimming of such components may be accomplished using methods known to those of skill in the art. It will be understood that the trimming and equipment installation illustrated in FIG. 14 is exemplary only, and that a wide variety of trimming operations and/or installation of equipment may be performed, as so desired, to fit individual applications and/or different composite structure types.

Following trimming and equipment installation, separable skin 302 may be permanently or removably fastened back in place in mating relationship with substructure 304. In one embodiment, separable skin 302 may be permanently attached to substructure 304 with, for example, film or paste adhesive (e.g., epoxy or phenolic resin), removable fasteners (e.g., rivets), etc. In an alternate embodiment, separable skin 302 may be removably attached to substructure 304 using, for example, removable fasteners such as screws, bolts, etc. It will be understood that separable skin 302 may also be cut into two or more sections which may be independently attached to substructure 304 in permanent and/or removable fashion. Further finishing operations may be performed including, but not limited to, attachment of composite wing structure 300 to other composite or non-composite structures (e.g., aircraft fuselage, wing exterior components, etc.), surface conditioning (e.g., sanding, painting, etc.) using methods known to those of skill in the art.

Although particular exemplary embodiments of RTM-formed composite aircraft wing structures having a single separable skin section and being of particular shape, size, and configuration have been described herein, it will be understood with benefit of the present invention that other shapes, sizes and configurations of aircraft composite structures, as well as non-aircraft composite structures may be advantageously constructed using the processes disclosed herein. Specific examples of other types of aircraft components that may be fabricated include, but are not limited to, horizontal stabilizer, tail components, helicopter blades, etc. Specific types of other non-aircraft structures that may be fabricated include, but are not limited to, stationary structures as previously described and other types of vehicular structures (e.g., space vehicle structures, automobile structures, train structures, boat structures), etc. Further, other configurations and types of molding equipment (mold halves, mandrels, fabrics, etc.) and/or process steps may be employed using the disclosed RTM process. For example, combinations of dry fabric materials and non-dry fabric materials may be employed in an RTM process to form a composite substructure to which one or more separable skins mate. Examples of such non-dry fabric materials include, but are not limited to, prepreg fiber materials, metal materials (e.g., components subjected to high stress such as a metal centerline rib component of a composite material horizontal stabilizer), etc. It will also be understood with benefit of this disclosure that an aircraft or non-aircraft composite structure may be constructed to have two or more individual separable skin sections, and that a given separable skin section may be of the same thickness, or of a greater or lesser thickness, than other outside layers of a composite structure formed using the disclosed single cure RTM process.

It will be understood that in addition to the exemplary RTM process embodiments described herein, benefits of the disclosed methods and structures may be realized in RTM methods employing lower pressure, lower temperatures and/or vacuum bag molding techniques, for example, to manufacture a composite material structural surround of a boat fuel tank with separable skin section for later insertion and of a fuel bladder. Further, the disclosed methods may be advantageously employed to manufacture RTM composite structures that are completely hollow, only partially hollow, or not hollow (e.g., having a separable skin to provide access to an internal skin for future tooling, installation of equipment, etc.). Other examples are structures that are filled with a filler material (e.g., foam-filled structure manufactured by composite lay up around the foam such as for small airplane using lower temperature pressure RTM process conditions that are compatible with the filler), etc. Furthermore, it will also be understood that although separating films which are substantially separable from both adjacent components of a cured composite structure have been described in relation to exemplary embodiments illustrated herein (e.g., adjacent cured composite material substructure and cured composite structure skin with separating film disposed therebetween), it is also possible that a separating film may only be substantially separable from one of the adjacent components of a cured composite structure. In such a case, for example, the separating film may remain attached or adhered to one adjacent composite structure component, and yet be substantially separable from the other so that the two adjacent composite structure components are substantially separable from each other by virtue of the separating film even though the separating film may remain permanently attached to one of the components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed structures and methods may be utilized in various combinations and/or independently. Thus, the invention is not limited to only those combinations shown herein, but rather may include other combinations. Furthermore, as used herein, the indefinite articles "a" and "an" connote "one or more."

What is claimed is:

1. A method of forming a composite structure, comprising:

positioning first and second material pieces adjacent each other within a mold cavity and with a separating film disposed between said first and second material pieces, said first material piece comprising an impregnable fiber material piece;

introducing a first resin into said mold cavity to contact and substantially impregnate said first material piece with said first resin;

allowing said first resin that substantially impregnates said first material piece to cure within said mold cavity to form a first part of said composite structure; and wherein said separating film is substantially impermeable to said first resin;

wherein said second material piece comprises fiber material pre-impregnated with a second resin; wherein said separating film is substantially impermeable to said second resin; and wherein said method further comprises allowing said second resin to cure within said mold cavity to form a second part of said composite structure;

wherein said first and second resins substantially do not adhere to said separating film during said curing of said resins so that said separating film is substantially separable from each of said composite structure first and second parts; and wherein said method further comprises:

removing said composite structure first and second parts from said mold cavity, separating said first and second composite structure parts from each other and removing said separating film, and then refitting said first and second composite structure parts together; and forming an open area within a surface of said composite structure first part after separating said first and second composite structure parts; wherein said open area is formed so as to be covered by said second composite structure part when said first and second composite structure parts are refitted together.

2. A method of forming a composite structure, comprising:

positioning first and second material pieces adjacent each other within a mold cavity and with a separating film disposed between said first and second material pieces, said first material piece comprising an impregnable fiber material piece;

introducing a first resin into said mold cavity to contact and substantially impregnate said first material piece with said first resin;

allowing said first resin that substantially impregnates said first material piece to cure within said mold cavity to form a first part of said composite structure; and wherein said separating film is substantially impermeable to said first resin;

wherein said second material piece comprises fiber material; wherein said separating film is substantially impermeable to said first resin; and wherein said method further comprises introducing a second resin into said mold cavity to contact and substantially impregnate said second material piece with said second resin and allowing said second resin to cure within said mold cavity to form a second part of said composite structure;

wherein said first and second resins substantially do not adhere to said separating film during said curing of said resins so that said separating film is substantially separable from each of said composite structure first and second parts; and wherein said method further comprises:

removing said composite structure first and second parts from said mold cavity, separating said first and second composite structure parts from each other and removing said separating film from between said first and second composite structure parts, and then refitting said first and second composite structure parts together;

forming an open area within a surface of said composite structure first part after separating said first and second composite structure parts; wherein said open area is formed so as to be covered by said second composite structure part when said first and second composite structure parts are refitted together.

3. A method of forming a cured composite structure, comprising:

positioning a first material piece at least partially around an outer surface of at least one mandrel, said first material piece comprising a dry fiber material piece;

positioning a second material piece adjacent said first material piece with a separating film disposed therebetween to form an uncured composite structure;

positioning said uncured composite structure and said mandrel within a closed mold cavity;

introducing a first resin into said closed mold cavity to contact and at least partially impregnate said first material piece with said first resin;

allowing said first resin that at least partially impregnates said first material piece to cure within said mold cavity to form at least a portion of a cured composite substructure, said cured composite substructure and said second material piece together forming said cured composite structure;

removing said cured composite structure from said closed mold cavity; and removing said mandrel from said cured composite substructure to form a hollow cured composite structure;

wherein said separating film is substantially impermeable to said first resin, and wherein said hollow cured composite substructure is substantially separable from said second material piece after removal from said closed mold cavity.

4. The method of claim 3, wherein said separating film is substantially separable from each of said hollow cured composite substructure and said second material piece after removal from said closed mold cavity; and wherein said method further comprises separating said separating film from said first and second composite structure skins after removal of said composite structure from said mold cavity; and then refitting said first and second composite structure skins together.

5. The method of claim 4, wherein said second material piece comprises fiber material pre-impregnated with a second resin; wherein said separating film is substantially impermeable to said second resin; and wherein said method further comprises allowing said second resin to cure within said mold cavity to form a cured composite structure skin of said cured composite structure.

6. The method of claim 3, wherein said separating film has opposing first and second surfaces; and wherein said positioning of a second material piece adjacent said first material piece with a separating film disposed therebetween comprises positioning at least one surface of said first material piece in contact with said first surface of said separating film and positioning at least one surface of said second material piece in contact with said second surface of said separating film; wherein said separating film substantially prevents said first resin from contacting said at least one surface of said second material piece that is in contact with said second surface of said separating film, and wherein said first resin substantially does not adhere to said separating film during said curing of said first resin so that said hollow cured composite substructure and said second material piece are substantially separable from each other after said first resin is cured and so that said separating film is substantially separable from each of said cured composite substructure and said second material piece after said first resin is cured; and wherein said method further comprises separating said separating film from said hollow cured composite substructure and said second material piece after removal of said composite structure from said mold cavity, and then refitting together said hollow cured composite substructure and said second material piece.

7. The method of claim 6, wherein said second material piece comprises fiber material pre-impregnated with a second resin; and wherein said method further comprises allowing said second resin to cure within said closed mold cavity to form a cured composite structure skin, wherein said separating film substantially prevents said second resin from contacting said at least one surface of said first fiber material piece that is in contact with said first surface of said separating film, and wherein said second resin substantially does not adhere to said separating film during said curing of said first and second resins so that said separating film is substantially separable from each of said hollow cured composite substructure and said cured composite structure skin after said first and second resins are cured; and wherein said method further comprises separating said separating film from said hollow cured composite substructure and said cured composite structure skin after removal of said composite structure film said mold cavity, and then refitting together said hollow cured composite substructure and said cured composite structure skin.

8. The method of claim 6, wherein said second material piece comprises a second fiber material piece; and wherein said method further comprises introducing a second resin into said closed mold cavity to contact and impregnate at least a portion of said second fiber material piece with said second resin; and wherein said method further comprises allowing said second resin to cure within said closed mold cavity to form a cured composite structure skin, wherein said separating film substantially prevents said second resin from contacting said at least one surface of said first fiber material piece that is in contact with said first surface of said separating film, and wherein said second resin substantially does not adhere to said separating film during said curing of said first and second resins so that said separating film is substantially separable from each of said hollow cured composite substructure and said cured composite structure skin after said first and second resins are cured; and wherein said method further comprises separating said separating film from said hollow cured composite substructure and said cured composite structure skin after removal of said composite structure from said mold cavity, and then refitting together said hollow cured composite substructure and said cured composite structure skin.

9. The method of claim 6, wherein at least:

said first material piece comprises one or more material pieces and wherein said at least one surface of said first material piece that is at least in partial contact with said first surface of said separating film has an integral open area defined therein between a first area of said first material piece and a second area of said first material piece; and wherein said method further comprises positioning a resin transport film between at least a portion of said at least one surface of said first material piece and at least a portion of said first surface of said separating film so that said resin transport film is in a position effective to transport said introduced first resin from said first area of said first material piece across said open area to said second area of said first material piece; or wherein said method further comprises forming an open area within an area of said hollow cured composite substructure after separating said hollow cured composite substructure and said second material piece; said open area corresponding to said at least one surface of said first material piece that is at least in partial contact with said first surface of said separating film during said curing; and wherein said open area is formed so as to be covered by said second material piece when said hollow cured composite substructure and said second material piece are refitted together; or a combination thereof.

10. A method of forming a hollow cured composite aircraft structure using a single cure resin transfer molding process, comprising:

positioning a first fiber material piece at least partially around an outer surface of at least one mandrel, said first material piece comprising a dry fiber material piece;

positioning a second fiber material piece adjacent said first fiber material piece with a separating film disposed therebetween to form an uncured composite aircraft structure, wherein said separating film has opposing first and second surfaces, and wherein at least one surface of said first material piece is positioned in contact with said first surface of said separating film and at least one surface of said second material piece is positioned in contact with said second surface of said separating film;

positioning said uncured composite aircraft structure and said mandrel within a closed mold cavity;

introducing a first resin into said closed mold cavity to contact and at least partially impregnate said first fiber material piece with said first resin;

allowing said first resin that at least partially impregnates said first fiber material piece to cure within said mold cavity during a single cure cycle to form at least a portion of a cured composite aircraft substructure;

allowing a second resin that at least partially impregnates said second fiber material piece to cure within said mold cavity during said single cure cycle to form at least a portion of a cured composite aircraft structure skin, said cured composite aircraft substructure and said cured composite aircraft structure skin together forming a cured composite aircraft structure;

removing said cured composite aircraft structure from said closed mold cavity; and removing said mandrel from said cured composite substructure to form said hollow cured composite aircraft structure;

wherein said separating film is substantially impermeable to said first and second resins so that said separating film substantially prevents said first resin from contacting said at least one surface of said second fiber material piece that is in contact with said second surface of said separating film, and wherein said separating film substantially prevents said second resin from contacting said at least one surface of said first fiber material piece that is in contact with said first surface of said separating film;

wherein said first resin substantially does not adhere to said separating film during said curing of said first resin, and wherein said second resin substantially does not adhere to said separating film during said curing of said second resin so that said cured composite aircraft substructure is substantially separable from said cured composite structure skin and so that said separating film is substantially separable from each of said cured composite aircraft substructure and said cured composite aircraft structure skin after said first and second resins are cured and after removal of said cured composite aircraft structure from said closed mold cavity; and wherein said method further comprises separating said separating film from said cured composite aircraft substructure and said cured composite aircraft structure skin after removal of said composite aircraft structure from said mold cavity, and then refitting together said hollow cured composite aircraft substructure and said cured composite aircraft structure skin.

11. The method of claim 10, wherein at least:

said first fiber material piece comprises one or more dry fiber material pieces and wherein said at least one surface of said first fiber material piece that is at least in partial contact with said first surface of said separating film has an integral open area defined therein between a first area of said first fiber material piece and a second area of said first fiber material piece; and wherein said method further comprises positioning a resin transport film between at least a portion of sail at least one surface of said first fiber material piece and at least a portion of said first surface of said separating film so that said resin transport film is in a position effective to transport said introduced first resin from said first area of said first fiber material piece across said open area to said second area of said first fiber material piece; or wherein said method further comprises forming an open area within an area of said hollow cured composite aircraft substructure after separating said hollow cured composite aircraft substructure and said cured composite aircraft skin; said open area corresponding to said at least one surface of said first fiber material piece that is at least in partial contact with said first surface of said separating film during said curing; and wherein said open area is formed so as to be covered by said second fiber material piece when said hollow cured composite aircraft substructure and said second fiber material piece are refitted together; or a combination thereof.

12. The method of claim 10, wherein said first fiber material piece comprises braided carbon fiber sleeve material, woven carbon fiber material, knitted carbon fiber material, stitched carbon fiber composite material, fiber tape material, or a mixture thereof.

13. The method of claim 12, wherein said second fiber material piece comprises fiber material pre-impregnated with a second resin; and wherein said method further comprises allowing said second resin to cure within said closed mold cavity during said single cure cycle to form said cured composite aircraft structure skin, wherein said separating film substantially prevents said second resin from contacting said at least one surface of said first fiber material piece that is in contact with said first surface of said separating film, and wherein said second resin substantially does not adhere to said separating film during said curing of said first and second resins so that said separating film is substantially separable from each of said hollow cured composite aircraft substructure and said cured composite aircraft structure skin after said first and second resins are cured; and wherein said method further comprises separating said separating film from said hollow cured composite aircraft substructure and said cured composite aircraft structure skin after removal of said cured composite aircraft structure from said mold cavity, and then refitting together said hollow cured composite aircraft substructure and said cured composite aircraft structure skin.

14. The method of claim 13, wherein said separating film comprises at least one of tetrafluoroethylene-based material, polyvinyl fluoride-based material, or a mixture thereof.

15. The method of claim 14, wherein said second fiber material piece comprises a core of honeycomb material surrounded by one or more layers of resin-impregnated prepreg fiber material.

16. The method of claim 10, further comprising positioning at least one third fiber material piece at least partially around said outer surface of said at least one mandrel prior to positioning said first fiber material piece at least partially around said outer surface of said at least one mandrel so that said third fiber material piece is disposed between said outer surface of said mandrel and an inner surface of said first fiber material piece, said third fiber material comprising a dry fiber material piece; and wherein said step of introducing a first resin into said closed mold cavity further comprises contacting and at least partially impregnating said third fiber material piece with said first resin; and wherein said step of allowing said first resin to cure within said mold cavity comprises allowing said first resin that at least partially impregnates said third fiber material piece to cure within said mold cavity during said single cure cycle to form at least a portion of said cured composite aircraft substructure.

17. The method of claim 16, wherein said at least one mandrel comprises at least two mandrels; and wherein said method further comprises positioning at least two respective third fiber material pieces at least partially around outer surfaces of said at least two respective mandrels and positioning said mandrels adjacent each other prior to positioning said first fiber material piece at least partially around said outer surface of said at least two mandrels so that said third fiber material piece is disposed between said outer surface of said mandrels and an inner surface of said first fiber material piece; wherein said first fiber material forms an outer skin of said cured composite aircraft substructure, and wherein at least a portion of said third fiber material pieces form one or more spar sections of said cured composite aircraft substructure.

18. The method of claim 17, wherein said aircraft structure is an aircraft wing structure, an aircraft vertical stabilizer tail structure, or an aircraft horizontal stabilizer tail structure.

19. The method of claim 3, wherein said first resin comprises a thermosetting resin.

20. The method of claim 10, wherein said each of said first and second resins comprises a thermosetting resin.

21. A method of forming a composite structure, comprising:
   positioning first and second material pieces adjacent each other within a mold cavity and with a separating film disposed between said first and second material pieces, said first material piece comprising an impregnable fiber material piece;
   introducing a first resin into said mold cavity to contact and substantially impregnate said first material piece with said first resin;
   allowing said first resin that substantially impregnates said first material piece to cure within said mold cavity to form a first part of said composite structure; and
   wherein said separating film is substantially impermeable to said first resin;
   wherein said second material piece comprises fiber material pre-impregnated with a second resin; wherein said separating film is substantially impermeable to said second resin; and wherein said method farther comprises allowing said second resin to cure within said mold cavity to form a second part of said composite structure; and
   wherein said first and second resins substantially do not adhere to said separating film during said curing of said resins so that said separating film is substantially separable from each of said composite structure first and second parts; and wherein said method further comprises removing said composite structure first and second parts from said mold cavity, separating said first and second composite structure parts from each other and removing said separating film, and then refitting said first and second composite structure parts together.

22. The method or claim 21, wherein said separating film substantially prevents said first resin from contacting said second material piece.

23. The method of claim 21, wherein said separating film has opposing first and second surfaces; and wherein said positioning comprises positioning at least one surface of said first material piece in contact with said first surface of said separating film and positioning at least one surface of said second material piece in contact with said second surface of said separating film, wherein said separating film substantially prevents said first resin from contacting said at least one surface of said second material piece so that said composite structure first part and said second material pieces are substantially separable from each other after said first resin is cured.

24. A method of forming a composite structure, comprising;
   positioning first and second material pieces adjacent each other within a mold cavity and with a separating film disposed between said first and second material pieces, said first material piece comprising an impregnable fiber material piece;
   introducing a first resin into said mold cavity to contact and substantially impregnate said first material piece with said first resin;
   allowing said first resin that substantially impregnates said first material piece to cure within said mold cavity to form a first part of said composite structure; and
   wherein said separating film is substantially impermeable to said first resin;
   wherein said second material piece comprises fiber material; wherein said separating film is substantially impermeable to said first resin; and wherein said method further comprises introducing a second resin into said mold cavity to contact and substantially impregnate said second material piece with said second resin and allowing said second resin to cure within said mold cavity to form a second part of said composite structure; and
   wherein said first and second resins substantially do not adhere to said separating film during said curing of said resins so that said separating film is substantially separable from each of said composite structure first and second parts; and wherein said method further comprises removing said composite structure first and second parts from said mold cavity, separating said first and second composite structure parts from each other and removing said separating film from between said first and second composite structure parts, and then refitting said first and second composite structure parts together.

25. A method of forming a composite structure, comprising:
   positioning first and second material pieces adjacent each other within a mold cavity and with a separating film disposed between said first and second material pieces, said first material piece comprising an impregnable fiber material piece;
   introducing a first resin into said mold cavity to contact and substantially impregnate said first material piece with said first resin wherein said separating film is substantially impregnable to said first resin;
   allowing said first resin that substantially impregnates said first material piece to cure within said mold cavity to form a first part of said composite structure; and
   wherein said first material piece comprises one or more material pieces and wherein at least one surface of said first material piece has an integral open area defined therein between a first area of said first material piece and a second area of said first material piece; and wherein said positioning comprises positioning said at least one surface of said first material piece adjacent a first surface of said separating film with a resin transport film disposed therebetween so that said resin transport film is in a position effective to transport said introduced resin from said first area of said first material piece across said open area to said second area of said first material piece;
   wherein said resin transport film comprises a dry fabric material.

26. A method of forming a composite structure, comprising:

> positioning first and second material pieces adjacent each other within a mold cavity and with a separating film disposed between said first and second material pieces, said first material piece comprising an impregnable fiber material piece;
>
> introducing a first resin into said mold cavity to contact and substantially impregnate said first material piece with said first resin;
>
> allowing said first resin that substantially impregnates said first material piece to cure within said mold cavity to form a first part of said composite structure; and
>
> wherein said separating film is substantially impermeable to said first resin;
>
> wherein said first material piece comprises one or more material pieces and wherein at least one surface of said first material piece has an integral open area defined therein between a first area of said first material piece and a second area of said first material piece;
>
> wherein said positioning comprises positioning said at least one surface of said first material piece adjacent a first surface of said separating film with a resin transport film disposed therebetween so that said resin transport film spans said integral open area between said first area of said first material piece and said second area of said first material piece to provide a resin transport path between said first area of said first material to said second area of said first material; and
>
> wherein said method further comprises transporting said introduced resin by said resin transport path from said first area of said first material piece across said open area to said second area of said first material piece.

* * * * *

UNITED STATES PATENT AND TRADEMARK OFFICE
CERTIFICATE OF CORRECTION

PATENT NO. : 6,638,466 B1
DATED : October 28, 2003
INVENTOR(S) : Abbott

It is certified that error appears in the above-identified patent and that said Letters Patent is hereby corrected as shown below:

Column 25,
Line 63, delete "film," and insert -- from --.

Column 27,
Line 62, delete "sail," and insert -- said --.

Column 29,
Line 39, delete "farther," and insert -- further --.

Signed and Sealed this

Twenty-third Day of December, 2003

JAMES E. ROGAN
*Director of the United States Patent and Trademark Office*